(12) United States Patent
Senior

(10) Patent No.: US 10,728,768 B2
(45) Date of Patent: Jul. 28, 2020

(54) APPARATUS AND METHOD FOR IMPROVING CONNECTIVITY FOR ITEMS OF USER EQUIPMENT IN A WIRELESS NETWORK

(71) Applicant: Airspan Networks Inc., Boca Raton, FL (US)

(72) Inventor: Paul Nicholas Senior, Oxon (GB)

(73) Assignee: Airspan Networks Inc., Boca Raton, FL (US)

( * ) Notice: Subject to any disclaimer, the term of this patent is extended or adjusted under 35 U.S.C. 154(b) by 0 days.

(21) Appl. No.: 16/001,550

(22) Filed: Jun. 6, 2018

(65) Prior Publication Data
US 2019/0110209 A1 Apr. 11, 2019

(30) Foreign Application Priority Data
Oct. 6, 2017 (GB) .................................. 1716422.9

(51) Int. Cl.
*H04W 16/26* (2009.01)
*H04W 16/18* (2009.01)
(Continued)

(52) U.S. Cl.
CPC .......... *H04W 16/18* (2013.01); *H04B 7/0617* (2013.01); *H04W 16/26* (2013.01);
(Continued)

(58) Field of Classification Search
CPC ... H04W 16/18; H04W 16/26; H04W 72/046; H04W 24/08; H04W 88/04; H04W 16/28;
(Continued)

(56) References Cited

U.S. PATENT DOCUMENTS 9,078,286 B1 * 7/2015 Yuan .................... H04W 88/085
9,462,531 B2 * 10/2016 Baldemair ............ H04W 40/24
(Continued)

FOREIGN PATENT DOCUMENTS

EP          2680635 A2    1/2014
GB         2014153237     9/2014
(Continued)

OTHER PUBLICATIONS

Ge et al., "5G Wireless Backhaul Networks: Challenges and Research Advances," IEEE Network, Nov./Dec. 2014, 6 pages.
(Continued)

*Primary Examiner* — Un C Cho
*Assistant Examiner* — Lalita W Pace
(74) *Attorney, Agent, or Firm* — Haynes Beffel & Wolfeld LLP; Mark A. Haynes; Andrew L. Dunlap

(57) ABSTRACT

An apparatus and method are provided, the apparatus having a first antenna system providing a first sector of a telecommunications network, a second antenna system providing a second sector of the telecommunications network, a third antenna system for communicating with a base station of the telecommunications network to provide a first wireless backhaul path for the first and second sectors, and a fourth antenna system providing a wireless communication link to facilitate coupling of the apparatus into a mesh network of devices, the mesh network having at least one point of access into the telecommunications network, providing at least one further wireless backhaul path. Backhaul management circuitry is arranged, in at least one mode of operation, to control utilisation of the third and fourth antenna systems to provide backhaul connectivity to the telecommunications network for items of user equipment connected to the apparatus via the first and second antenna systems.

25 Claims, 15 Drawing Sheets

(51) Int. Cl.
*H04B 7/06* (2006.01)
*H04W 24/08* (2009.01)
*H04W 72/04* (2009.01)
*H04W 16/28* (2009.01)
*H04W 88/04* (2009.01)
*H04W 84/18* (2009.01)

(52) U.S. Cl.
CPC ......... *H04W 24/08* (2013.01); *H04W 72/046* (2013.01); *H04W 16/28* (2013.01); *H04W 84/18* (2013.01); *H04W 88/04* (2013.01)

(58) Field of Classification Search
CPC ........ H04W 84/18; H04L 45/22; H04L 45/24; H04L 45/44; H04L 45/30; H04L 47/125; H04L 45/00; H04L 45/70; H04L 47/24; H04L 47/2416; H04L 47/2433
See application file for complete search history.

(56) References Cited

U.S. PATENT DOCUMENTS

| | | | | |
|---|---|---|---|---|
| 10,009,776 B1* | 6/2018 | Allen | .................... | H04W 16/26 |
| 2008/0080364 A1 | 4/2008 | Barak et al. | | |
| 2008/0112363 A1* | 5/2008 | Rahman | ................ | H04W 8/005 |
| | | | | 370/331 |
| 2009/0041039 A1* | 2/2009 | Bear | ........................ | H04L 45/38 |
| | | | | 370/401 |
| 2009/0111456 A1* | 4/2009 | Shaffer | ................. | H04W 36/30 |
| | | | | 455/422.1 |
| 2009/0274130 A1* | 11/2009 | Boch | ....................... | H01Q 1/125 |
| | | | | 370/338 |
| 2010/0033390 A1* | 2/2010 | Alamouti | ............. | H01Q 21/007 |
| | | | | 343/755 |
| 2011/0164527 A1* | 7/2011 | Mishra | .................. | H04L 45/123 |
| | | | | 370/252 |
| 2011/0237255 A1* | 9/2011 | Furukawa | .......... | H04B 7/15535 |
| | | | | 455/436 |
| 2014/0160939 A1* | 6/2014 | Arad | ..................... | H04L 47/122 |
| | | | | 370/237 |
| 2014/0287791 A1* | 9/2014 | Ozluturk | ................ | H04B 7/026 |
| | | | | 455/509 |
| 2015/0215854 A1 | 7/2015 | Ling | | |
| 2015/0244430 A1* | 8/2015 | Shattil | .................. | H04B 1/0003 |
| | | | | 370/254 |
| 2015/0334750 A1* | 11/2015 | Mehta | ................... | H04W 76/10 |
| | | | | 370/329 |
| 2015/0373615 A1 | 12/2015 | Hampel | | |
| 2017/0127399 A1 | 5/2017 | Negus et al. | | |
| 2017/0164263 A1* | 6/2017 | Lindoff | ................. | H04W 40/12 |
| 2018/0054772 A1* | 2/2018 | Tan | ....................... | H04W 76/10 |
| 2018/0343685 A1* | 11/2018 | Hart | ...................... | H04W 76/15 |
| 2019/0132783 A1* | 5/2019 | Deng | .................... | H04W 36/08 |

FOREIGN PATENT DOCUMENTS

| | | | | |
|---|---|---|---|---|
| WO | WO-2007029947 A1 * | 3/2007 | .......... | H04L 45/121 |
| WO | 2014124048 | 8/2014 | | |

OTHER PUBLICATIONS

PCT Search Report and Written Opinion for PCT/GB2018/051153 dated Jul. 3, 2018, 16 pages.

UK Search Report for priority Application No. GB1716422.9 dated Mar. 6, 2018, 4 pages.

PCT IPRP for PCT/GB2018/051153 dated Oct. 30, 2019, 18 pages.

* cited by examiner

APPARATUS AND METHOD FOR IMPROVING CONNECTIVITY FOR ITEMS OF USER EQUIPMENT IN A WIRELESS NETWORK

BACKGROUND

The present technique relates to an apparatus and method for improving connectivity for items of user equipment in a wireless network.

As more and more users embrace mobile technology, this is placing ever increasing demands on the mobile networks used to support mobile communication. The networks are required to not only support an ever increasing number of devices, but also as the functionality associated with such devices becomes ever more complex, so this has also increased the capacity requirements within the network.

Accordingly, there is a need for network operators to provide increased network coverage, but also to improve network capacity so as to service the high performance demands placed upon the network by users of modern smartphones and the like.

The problems of providing sufficient network coverage and capacity can be particularly problematic in urban environments, where there is typically not only a high density of users, but where the urban infrastructure, such as large buildings, can significantly attenuate signals, and hence exacerbate the problem of seeking to provide sufficient network coverage and network capacity to service the users. Accordingly, it would be desirable to provide techniques that enabled coverage and capacity to be improved.

In addition, as innovative techniques are developed to seek to address these issues, improvements in backhaul connectivity would be desirable to manage the increasing volume of traffic to be routed over backhaul connections.

SUMMARY

In one example configuration, there is provided an apparatus comprising: a first antenna system to provide a first sector of a telecommunications network; a second antenna system to provide a second sector of the telecommunications network; a third antenna system to communicate with a base station of the telecommunications network to provide a first wireless backhaul path for said first sector and said second sector; a fourth antenna system to provide a wireless communication link to facilitate coupling of the apparatus into a mesh network of devices, the mesh network having at least one point of access into the telecommunications network such that the mesh network supports provision of at least one further wireless backhaul path for said first sector and said second sector; and backhaul management circuitry operable, in at least one mode of operation, to control utilisation of the third antenna system and the fourth antenna system to provide backhaul connectivity to the telecommunications network for at least items of user equipment connected to the apparatus via the first and second antenna systems.

In another example configuration, there is provided a method of operating an apparatus having first, second, third and fourth antenna systems to provide network coverage in a telecommunications network, comprising: employing the first antenna system to provide a first sector of the telecommunications network; employing the second antenna system to provide a second sector of the telecommunications network; employing the third antenna system to communicate with a base station of the telecommunications network to provide a first wireless backhaul path for said first sector and said second sector; employing the fourth antenna system to provide a wireless communication link to facilitate coupling of the apparatus into a mesh network of devices, the mesh network having at least one point of access into the telecommunications network such that the mesh network supports provision of at least one further wireless backhaul path for said first sector and said second sector; and in at least one mode of operation, controlling utilisation of the third antenna system and the fourth antenna system to provide backhaul connectivity to the telecommunications network for at least items of user equipment connected to the apparatus via the first and second antenna systems.

In a yet further example configuration, there is provided an apparatus comprising: first antenna means for providing a first sector of a telecommunications network; second antenna means for providing a second sector of the telecommunications network; third antenna means for communicating with a base station of the telecommunications network to provide a first wireless backhaul path for said first sector and said second sector; fourth antenna means for providing a wireless communication link to facilitate coupling of the apparatus into a mesh network of devices, the mesh network having at least one point of access into the telecommunications network such that the mesh network supports provision of at least one further wireless backhaul path for said first sector and said second sector; and backhaul management means for controlling, in at least one mode of operation, utilisation of the third antenna means and the fourth antenna means to provide backhaul connectivity to the telecommunications network for at least items of user equipment connected to the apparatus via the first and second antenna means.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
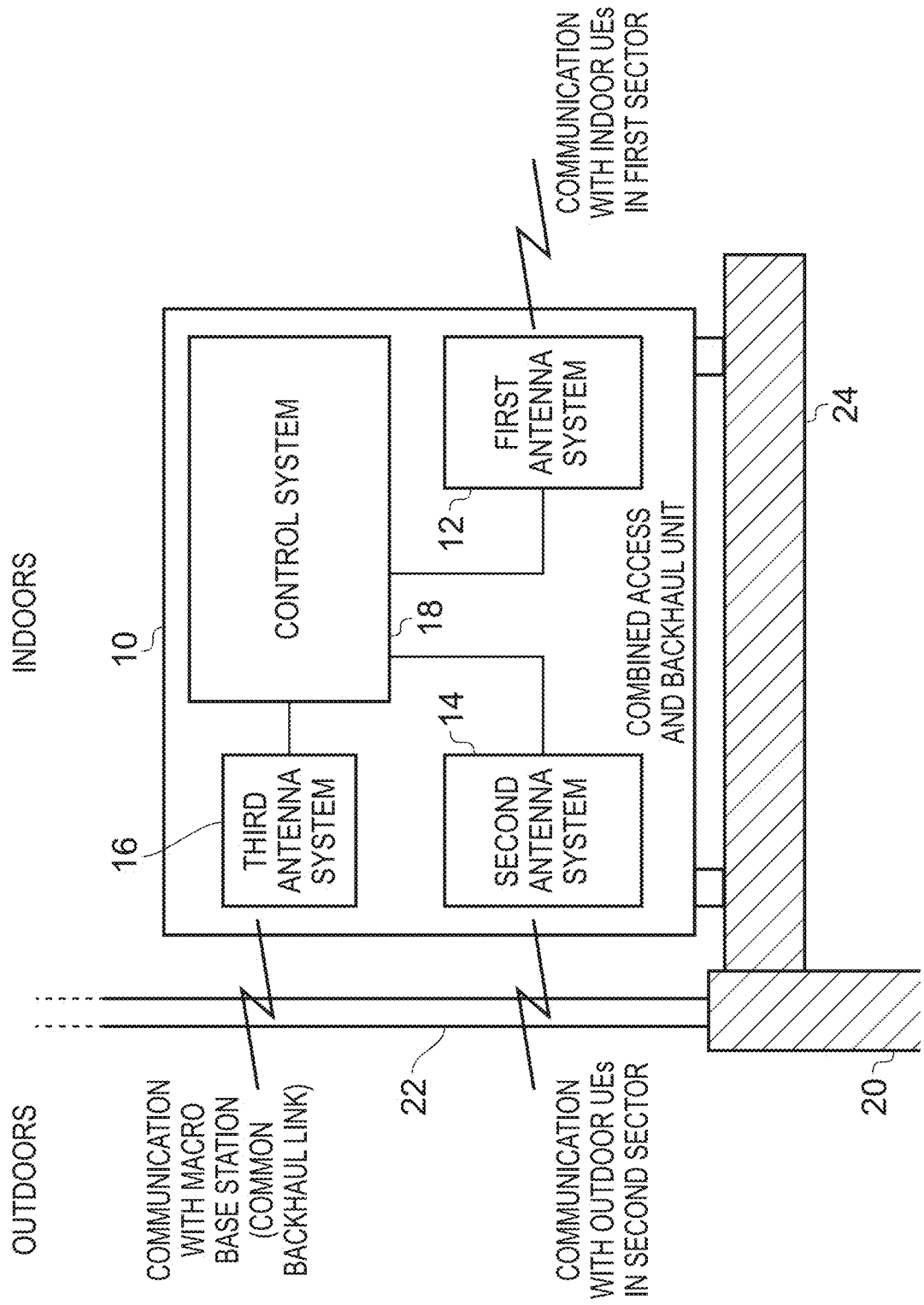
FIG. 1 is a block diagram schematically illustrating an apparatus in which the presently described techniques can be employed.

Before discussing the embodiments with reference to the accompanying figures, the following description of embodiments is provided.

In one embodiment, an apparatus is provided that has a first antenna system for providing a first sector of a telecommunications network and a second antenna system for providing a second sector of the telecommunications network. The apparatus is arranged to communicate with a base station of the telecommunications network via a third antenna system, the third antenna system providing a first wireless backhaul path for the first sector and the second sector. Hence, via the third antenna system, a common wireless backhaul path can be provided for the first sector and the second sector.

By such an arrangement, the apparatus can provide significant network coverage and capacity improvements within a wireless network. In particular, by providing both a first sector of coverage and a second sector of coverage through the first and second antenna systems, it is possible to seek to alleviate multiple coverage and/or capacity issues using a single apparatus. For example, as will be discussed in more detail later, the apparatus can be deployed within a building such that the first antenna system can provide a first sector of coverage that extends into the building to provide enhanced availability of the network inside the building. Items of user equipment that connect to the first antenna system from within the building can then be connected into the network via the common wireless backhaul path. However, in addition, the second antenna system can be arranged, for example, so that the second sector extends externally to the building to provide an additional source of network coverage to items of user equipment external to the building. Again, when an item of user equipment connects via the second antenna system, it may be connected into the network via the common wireless backhaul path.

However, while such an apparatus can provide significant improvements in terms of network coverage and capacity, there is a potential for the common wireless backhaul path to become a bottleneck in traffic flow through the network. Further, as emerging telecommunications Standards use ever higher frequencies, the wireless backhaul communication path provided by the third antenna system can become more susceptible to attenuation due to obstacles in the path between the third antenna system and the base station, which can reduce the reliability of the first wireless backhaul path. In accordance with the described embodiments, this issue is alleviated by providing the apparatus with a fourth antenna system that facilitates coupling of the apparatus into a mesh network of devices. The mesh network is arranged so that it has at least one point of access into the telecommunications network, such that the mesh network can then support provision of at least one further wireless backhaul path. Backhaul management circuitry is then provided which is operable, in at least one mode of operation, to control utilisation of the third antenna system and the fourth antenna system to provide backhaul connectivity to the telecommunications network for at least items of user equipment connected to the apparatus via the first and second antenna systems.

The backhaul management circuitry may be arranged to always operate as discussed above to control how the third and fourth antenna systems are used, but alternatively in some embodiments it may be possible to turn off the functionality of the backhaul management circuitry in some situations, so that for example all backhaul communication proceeds via the third antenna system.

The devices forming the mesh network can take a variety of forms. However, in one embodiment, the above described apparatus including the four antenna systems can be readily deployed in significant numbers in a dense urban environment, enabling a significant number of small cells to be established, each providing multiple sectors of coverage, for example each providing an indoor sector and an outdoor sector. In such a scenario, many of these instances of the apparatus can be coupled to each other via their fourth antenna system in order to form a mesh network. By such an approach, one instance of the apparatus whose third antenna system may not be able to establish a good quality wireless backhaul path directly with the base station, may instead be arranged to couple into the mesh network, allowing it to make use of a better wireless backhaul path provided by a third antenna system of at least one other instance of the apparatus.

By allowing the backhaul management circuitry to make use of one or more further wireless backhaul paths supported by the provision of the mesh network, it is possible to enhance the overall performance of the backhaul connection. Firstly, if the performance of the first wireless backhaul path provided by the third antenna system degrades for any reason, the ability to use an alternative backhaul path provided via the mesh network provides the backhaul management circuitry with a replacement mechanism to use. In addition, during normal operation the backhaul management circuitry may employ link aggregation techniques so as to use the first wireless backhaul path provided by the third antenna system and one or more further wireless backhaul paths provided by the mesh network in combination to increase the overall capacity of the backhaul connection.

Such an approach hence provides a very efficient and flexible mechanism for supporting backhaul connectivity when using an apparatus of the above described type.

The mesh network can be formed using any suitable known mesh topology to form the mesh network. In one embodiment, each instance of the apparatus that is to form one of the devices within the mesh network can be arranged to execute a mesh topology algorithm in order to establish decentralised connection arrangements with one or more other devices forming the mesh network. The devices may seek to form a full mesh topology or a partial mesh topology. In a full mesh topology, each device is arranged to connect directly to each of the other devices. In a partial mesh topology, the devices will typically not connect to all of the others, but instead will connect to only a subset of the devices. In a typical deployment, it is likely that a partial mesh topology will be formed between the devices, but the aim is that the connections made within the mesh network provide the backhaul management circuitry within an instance of the above described apparatus with a route through the mesh network to at least one point of access into the telecommunications network, thereby supporting provision of at least one further wireless backhaul path for that instance of the apparatus.

In one embodiment, the backhaul management circuitry may be arranged to use the available wireless backhaul paths to provide backhaul connectivity only for items of telecommunications equipment connected to the first antenna system or the second antenna system. Effectively, in such an arrangement, the apparatus becomes, via its fourth antenna system, a leaf node within the mesh network. However, in an alternative embodiment, the wireless backhaul resources available to the apparatus can be managed by the backhaul management circuitry so as to allow the third antenna system and the fourth antenna system to also provide backhaul connectivity to the telecommunications network for items of user equipment that connect to other devices within the mesh network. For example, the backhaul management circuitry may be able to establish that there is sufficient capacity within the available wireless backhaul paths to support backhaul traffic from items of telecommunications equipment that do not directly connect via the first or second antenna systems of the apparatus, but instead connect to other devices within the mesh network. This hence provides significant flexibility in how the available backhaul resource is used within the system, with the aim of increasing the overall network coverage and capacity.

The apparatus of the described embodiment may be deployed at various locations. However, in one embodiment the apparatus is deployed at a periphery of a building, and the fourth antenna system may be configured to generate at least one beam pattern that propagates away from the building to facilitate communication with at least one device of the mesh network external to the building. By ensuring that the beam pattern of the fourth antenna system is directed away from the building, this can increase the likelihood that a satisfactory connection can be made to one or more other devices within the mesh network, and when a good quality connection is made, this increases the overall capacity available via that mesh link, thereby improving the overall efficiency and effectiveness of the mesh network.

In one embodiment, the fourth antenna system may comprise at least one array of antenna elements, and the apparatus may further comprise beamforming circuitry to control the at least one beam pattern when establishing communication with another device of the mesh network. This can further enhance the ability to establish a good quality link with at least one other device within the mesh network. For example, in one embodiment a sweep operation can be performed to sweep the beam of the fourth antenna (either electronically or mechanically) through a range of angles in order to determine which other devices of the mesh network are candidates for connection, and then to set the beam pattern based on the results of that analysis, so as to establish good quality links with at least one other device within the mesh network.

There are a number of ways in which the backhaul management circuitry may determine which wireless backhaul paths are used to provide backhaul connectivity at any particular point in time. For example, in one embodiment the backhaul management circuitry may comprise backhaul options analysis circuitry to perform a backhaul determination process to evaluate, for both said first wireless backhaul path and one or more routes through the mesh network to support said at least one further wireless backhaul path, at least one metric indicative of link quality, and to select, in dependence on said evaluation, one or more of the first and at least one further wireless backhaul paths to be used to provide backhaul connectivity. Hence, as a result of performing the backhaul determination process, one or more wireless backhaul paths can be selected that are then used to provide the backhaul connectivity. The process may for example in some instances decide to use the first wireless backhaul path provided by the third antenna system, in other instances may choose to use one or more wireless backhaul paths supported via the mesh network, whilst in other instances it may decide to use a combination of the first wireless backhaul path provided by the third antenna system and one or more of the wireless backhaul paths supported by the mesh network.

The backhaul determination process can be re-performed as desired. In one embodiment, the backhaul options analysis circuitry is arranged to re-perform the backhaul determination process on occurrence of a trigger condition. A trigger condition can take a variety of forms, and may for example in one embodiment be the elapse of a timer. This could by way of specific example enable the backhaul determination process to be re-performed every few minutes. This would enable the process to take advantage of any modification in the mesh links resulting from application of the mesh topology algorithm by the various devices of the mesh network. In particular, it will be appreciated that the various links within the mesh network can evolve over time, for example to take account of further devices added into the mesh network and to take account of environmental factors that can introduce sources of interference, with application of the mesh topology algorithm enabling the mesh to evolve over time so as to seek to continue to provide high performance links. In one embodiment, this process of evolution is arranged to happen on a regular basis, with the aim of continually seeking to maintain/improve the quality of the backhaul connection.

In one embodiment, the backhaul management circuitry may further comprise traffic monitoring circuitry to evaluate available capacity of the one or more wireless backhaul paths selected by the backhaul options analysis circuitry, and to determine based on said evaluation whether to allow the apparatus to act as a routing node within the mesh network, when acting as a routing node the apparatus being arranged to control usage of at least one of the third antenna system and the fourth antenna system to provide backhaul connectivity to the telecommunications network for items of user equipment connected to devices within the mesh network other than said apparatus. Hence, when it is determined that the available capacity within the selected wireless backhaul paths is sufficient to support backhaul traffic over and above that required by the apparatus itself, then the apparatus can be designated as a routing node within the mesh network, allowing other instances of the apparatus to route their backhaul traffic through it.

Conversely, in one embodiment, when the traffic monitoring circuitry determines that the available capacity is less than a selected threshold, the apparatus is constrained to act as a leaf node within the mesh network, when acting as a leaf node the apparatus being arranged to control usage of at least one of the third antenna system and the fourth antenna system to solely provide backhaul connectivity to the telecommunications network for items of user equipment connected to the apparatus via the first and second antenna systems. Hence, if the quality of the available links deteriorates, the backhaul management circuitry can identify that the apparatus now needs to be constrained as a leaf node, so that other instances of the apparatus will then perform a re-evaluation of the available mesh network links in order to seek to route their backhaul traffic via paths that avoid the leaf node. By such an approach, the backhaul management circuitry can seek to establish links that provide at least enough capacity for the backhaul traffic of the associated apparatus, and when spare capacity is available can make that capacity available to other devices within the mesh network, thereby improving overall throughput through the mesh network.

In instances where the backhaul management circuitry determines that both the third antenna system and the fourth antenna system can be used to provide backhaul connectivity for the apparatus, then there are a number of ways in which the backhaul management circuitry may be configured to determine when to use the first wireless backhaul path provided by the third antenna system and when to use the backhaul connectivity provided through the mesh network. In one embodiment, the backhaul management circuitry comprises traffic type analysis circuitry to determine, for each block of backhaul traffic, a type of that traffic, and to select which one of the first wireless backhaul path and the at least one further wireless backhaul path is used for propagation of that block of backhaul traffic dependent on the determined type of that traffic. Hence, the backhaul management circuitry can determine which mechanism to use dependent on the nature of the traffic that is being transmitted.

Furthermore, the granularity at which the backhaul management circuitry determines the mechanism to be used can be varied dependent on embodiment, with the block of backhaul traffic being chosen accordingly. However, in one embodiment, each block comprises a packet, such that the determination as to which of the first wireless backhaul path and at least one further wireless backhaul path to use is made on a packet-by-packet basis. This can provide a very fine-grained level of control over which of the available backhaul mechanisms is used for transmission of the backhaul traffic.

There are a number of ways in which the backhaul management circuitry may categorise the traffic based on its type. However, in one embodiment the backhaul management circuitry determines from the type of traffic whether the associated block of backhaul traffic is considered to be low importance or high importance, and is arranged to route backhaul traffic of high importance via one of the first wireless backhaul path and at least one further wireless backhaul path that is chosen in dependence on path latency. Which of the available paths is the lowest latency path will vary dependent on the implementation. For example, whilst it may often be the case that the direct backhaul path provided by the third antenna system has the lowest latency, in some instances it may be possible to establish an even lower latency path through the mesh network, and hence in those instances high importance traffic may be routed via the mesh network if it is determined that that is the lower latency path.

Whether the traffic is considered to be of high importance or low importance will vary dependent on implementation. However, in one embodiment backhaul traffic is considered to be of high importance if timing of delivery of that backhaul traffic is important. The importance of the timing of delivery for any particular packet of backhaul traffic can be dependent upon a variety of factors. For example, certain packets of traffic may be identified as real-time traffic, where it is important that the traffic is delivered in a particular time frame. As another example, certain users may have particular guaranteed quality of service (QoS), and this may cause at least some types of the traffic relating to one user's item of user equipment to be given a higher priority than traffic relating to another user, and hence be considered to be of high importance. As another example, the type of the traffic itself may directly indicate importance. For instance, in one embodiment the backhaul traffic may comprise control traffic pertaining to control of the apparatus and user traffic pertaining to communications between the apparatus and connected items of user equipment. The backhaul management circuitry may then be arranged to always treat control traffic as of high importance, and to selectively treat each block of user traffic as of high importance or low importance dependent on the type of that user traffic.

In one embodiment, the backhaul management circuitry comprises traffic disassembly circuitry configured, in dependence on the type of traffic determined by the traffic type analysis circuitry, to disassemble a stream of backhaul traffic to be sent from the apparatus in order to form a first sub-stream to be sent via the first wireless backhaul path and a second sub-stream to be sent via the at least one further wireless backhaul path. These separate sub-streams can then later be reassembled within the network, for example using components provided within the network carrier's core infrastructure. For instance, in one embodiment a network component may be provided for deploying in a network that comprises at least one instance of the above described apparatus. The network component may comprise a first interface to receive the first sub-stream via a macro base station of the network, a second interface to receive the second sub-stream via the least one further wireless backhaul path, and traffic reassembly circuitry configured to aggregate together the first and second sub-streams in order to form a stream of backhaul traffic for onward propagation within the network.

In one embodiment, the backhaul disassembly/reassembly mechanism can also be employed in the reverse direction to control routing of downstream backhaul traffic from the carrier's core infrastructure to the above-described apparatus. In such instances, the apparatus may further comprise downlink traffic reassembly circuitry, responsive to a first downlink sub-stream received via the third antenna system and a second downlink sub-stream received via said fourth antenna system, to aggregate together the first and second downlink sub-streams in order to form a stream of downlink backhaul traffic.

Further, in such instances, the network component may further comprise downlink traffic disassembly circuitry to disassemble a stream of downlink backhaul traffic to be sent to the apparatus, in order to form a first downlink sub-stream to be sent to the apparatus via the common wireless backhaul path, and a second downlink sub-stream to be sent to the apparatus via the mesh network.

The communications between the various devices in the mesh network can take a variety of forms, in order to support backhaul connectivity into the telecommunications network. In one embodiment, the devices of the mesh network are coupled via wireless mesh links that operate as backhaul links, and the fourth antenna system is arranged to establish a backhaul link with at least one device of the mesh network. Hence, the individual mesh links form backhaul links.

However, in an alternative embodiment, the devices of the mesh network are coupled via wireless mesh links that operate as fronthaul links, and the mesh network's at least one point of access into the telecommunications network provides said at least one further wireless backhaul path. The fourth antenna system is then arranged to establish a fronthaul link with at least one device of the mesh network. Hence, in accordance with this alternative embodiment, the baseband unit (BBU) functionality can be centralised, rather than each individual device having to provide baseband processing functionality. Instead, a number of the devices can be provided with radio unit functional blocks for processing the radio signals, these radio unit functional blocks sometimes being referred to as remote radio heads (RRHs), and those devices communicate with another device that provides a centralised baseband controller to perform baseband processing. The device with the centralised baseband controller can then establish the backhaul connection into the telecommunications network, whilst the communications between that centralised baseband controller and the devices employing remote radio heads may take the form of fronthaul links. Such an arrangement has been found to be possible within the proposed mesh network, due to the high bit rates and low latency that can be achieved between the various mesh links, hence facilitating the provision of fronthaul links.

The ability to support fronthaul links within the mesh network can give rise to a number of potential benefits. For example, in one embodiment the apparatus may be arranged to form a cluster with one or more other devices of the mesh network, the cluster forming a virtual radio access network for items of user equipment that connect to at least one antenna provided by the cluster. Hence, from the item of user equipment's point of view, the item of user equipment does not distinguish between the different devices within the cluster, but sees the cluster as one virtual access point into the network (with the distributed devices within the cluster delivering the same functionality as a physical RAN). When the multiple instances of the apparatus operate this way to form a cluster, then the first and second antenna systems within each of the individual instances of the apparatus can be arranged to operate in a coordinated manner. For example, the apparatus may further comprise coordination control circuitry to operate in coordination with coordination control circuitry in the other devices in the cluster to employ at least one technique to enhance spectral efficiency of communication with items of user equipment that connect to the cluster. There are a number of ways in which the spectral efficiency may be enhanced within such an arrangement. For example, the various antenna systems can be used cooperatively to provide coordinated multipoint communication, multiple-input multiple-output (MIMO) techniques may use the multiple transmit and receive antennas within the cluster to exploit multipath propagation, etc.

As mentioned earlier, within such a cluster one of the devices may provide baseband processing. In one particular embodiment, the cluster is arranged so that at least one of the devices provides a media access control (MAC) layer that is shared with at least one other device within the cluster. In such an embodiment, each of the individual devices in the cluster may be provided with its own PHY (physical layer) processing unit for connecting to the media access control layer provided in a subset (e.g. one) of the devices.

The fourth antenna system can be arranged to communicate at any suitable desired frequency, but in one embodiment is arranged to communicate using either mm wave or microwave wireless signals. In one particular embodiment, the apparatus may operate in accordance with the 5G New Radio (5G NR) Standard and the fourth antenna system may operate for example at 24 GHz or 28 GHz (in the microwave frequency range), or at 37 to 42.5 GHz, or 57 to 86 GHz (in the mm wave frequency range). In another example arrangement, the fourth antenna system may be able to operate in accordance with the WiGig Standard at 60 GHz. Hence, the fourth antenna system can be arranged to operate at frequencies that are significantly higher than the frequencies employed by the first, second and third antenna systems. For example, assuming the apparatus is deployed in a system using the 5G NR telecommunications Standard, the first, second and third antenna systems will use frequency channels below 6 GHz.

The first, second and third antenna systems can be configured in a variety of ways, but in one embodiment the third antenna system operates with a signal frequency different to the signal frequency employed by the first and second antenna systems. This can alleviate interference between the signals being processed by the first and second antenna systems and the signals being processed by the third antenna system, hence providing a more reliable and efficient backhaul link via the third antenna system. However, in one embodiment the different frequency used for the third antenna system can still be in the same frequency band as is used by the first and second antenna systems, enabling efficient utilisation of the network resources.

The above described apparatus can be deployed in a variety of settings. However, in one embodiment the first and the second antenna systems may be arranged so that when the apparatus is deployed at a periphery of a building, the first sector provided by the first antenna system extends into the building to provide enhanced availability of the network to items of user equipment within the building. However, in addition the second sector extends externally to the building to provide an additional source of network coverage to items of user equipment external to the building.

Modern telecommunications Standards, such as the Long-Term Evolution (LTE) Standard or the 5G New Radio (NR) Standard, allow for high-speed wireless communication with items of user equipment. However, the signals propagated from the base stations typically do not have good indoor penetration. By placing the above described apparatus at a periphery of a building, a good quality link can typically be established via the third antenna system to a base station of the network, with the use of the first antenna system then allowing for a first sector of coverage to be established that extends into the building to provide enhanced availability of the network inside the building.

However, in addition, in urban environments it is also often the case that items of user equipment in the open environment, for example belonging to users moving around at street level between buildings, can experience poor connectivity. In particular, pockets of poor network coverage may develop, and even in areas where there is network coverage, the link quality established with the base station may be relatively poor, resulting in reduced bit rates observed by the item of user equipment, and a less efficient utilisation of the available network spectrum. This reduces not only the quality of the service observed by certain users, but also can degrade the overall spectral efficiency of the network.

However, in accordance with the above described apparatus, the same apparatus that is used to create a first sector that extends into the building to provide enhanced availability of the network to items of user equipment within the building, is also able to re-radiate network coverage externally to the building, by use of the second antenna system to provide an additional, second, sector for the network. Accordingly, items of user equipment external to the building are now provided with a further connection option for connecting into the network. In particular, whilst it is still possible that they may connect directly to a macro base station of the network, when they are present within the geographical coverage area covered by the second sector they can instead connect to the network via the second antenna system of the apparatus, with the third antenna system then being used to provide a backhaul connection into the network for those users (along with users connected via the first antenna system), in combination with the mesh network connection as discussed earlier.

This provides significantly enhanced flexibility, and can also give rise to significant spectral efficiency improvements within the network. In particular, the apparatus can be configured to provide a high quality backhaul communication link to the base station of the network, supplemented by the additional backhaul mechanism supported by the mesh network as appropriate, and in addition can provide high quality connections for items of user equipment residing within the first sector and the second sector. This can lead to the establishment of high performance links that can employ efficient modulation schemes to make more efficient use of the available spectrum, when compared with a situation where those items of user equipment instead establish a direct connection to the macro base station of the network. As a result, the overall spectral efficiency of the network can be increased.

The apparatus of the described embodiments may be positioned externally to the building at the periphery, for example by being mounted on an exterior wall of the building, but in one embodiment the apparatus is deployed inside the building at the periphery, in which event the second antenna system is configured to generate at least one beam pattern that propagates through the periphery to facilitate communication with at least one item of user equipment within the second sector. If desired, directional antennas can be used to generate a beam pattern that radiates in a desired direction externally to the building. For example, this second antenna system may be arranged so as to radiate a beam pattern that will ensure good coverage for users at street level. Alternatively, or in addition, the beam pattern created by the second antenna system may cause the second sector to extend across a street into an adjacent building, so that items of user equipment within that adjacent building may be able to connect into the network via the apparatus.

In situations where the apparatus is deployed inside the building at the periphery, the third antenna system and the fourth antenna system may also be configured to generate at least one beam pattern that propagates through the periphery to provide the common wireless backhaul link. Again, directional antennas can be used if desired, to seek to improve the quality of the connection with the base station of the network and one or more devices of the mesh network, and thereby enhance the capacity of the wireless backhaul link provision.

The apparatus can be deployed in a variety of locations, but in one embodiment is intended to be deployed adjacent to a window at the periphery of the building. In one particular embodiment, the apparatus is shaped so as to facilitate placement on a windowsill. This can provide a very convenient location for the apparatus, where it does not get in the way of users going about their business inside the building, and where it is likely that a strong connection with the base station of the network can be established.

By providing an apparatus that can be easily deployed within a building, this can provide a very cheap and efficient mechanism for a network operator to rapidly increase network coverage, whilst also facilitating improved spectral efficiency, and thereby enhancing the capacity of the network.

Particular embodiments will now be described with reference to the Figures.

FIG. 1 schematically illustrates an apparatus 10 in which the presently described technique can be employed. Herein, the apparatus will also be referred to as a combined access and backhaul unit. As shown, the combined access and backhaul unit 10 may in one embodiment be positioned adjacent to a periphery 20, 22 of a building. In one particular embodiment, it is located on a windowsill 24 adjacent to a window 22 at the periphery of the building.

The combined access and backhaul unit 10 has a number of distinct antenna systems. In particular, a first antenna system is used to provide a first sector of the network that extends into the building so as to provide enhanced availability of the network to items of user equipment within the building. To access the network for any items of user equipment that connect via the first antenna system, it is necessary to connect the apparatus 10 into the network. This is achieved through use of the third antenna system 16, which is arranged to establish a backhaul path with a base station of the network. Since such a base station will typically be provided externally to the building, the third antenna system is arranged to generate at least one beam pattern that propagates through the window 22 to establish a wireless backhaul path with the base station.

Modern telecommunications Standards, such as the LTE Standard, allow for high-speed wireless communication with items of user equipment. However, the signals propagated from the base stations typically do not have good indoor penetration. By placing the apparatus 10 at a periphery of a building, a good quality link can typically be established via the third antenna system to a base station of the network, with the use of the first antenna system 12 then allowing for a first sector of coverage to be established that extends into the building to provide enhanced availability of the network inside the building.

However, in addition, in urban environments it is also often the case that items of user equipment in the open environment, for example belonging to users moving around at street level between buildings, can experience poor connectivity. For example, pockets of poor network coverage may develop, due to shadowing from buildings and the like, and even in areas where there is network coverage, the link quality established with the base station may be relatively poor. This can result not only in reduced quality of service observed by certain users, but also can degrade the overall spectral efficiency of the network due to the less efficient utilisation of the available network spectrum that can result from use of such poor quality links.

To address this problem, the combined access and backhaul unit 10 provides an additional antenna system, namely the second antenna system 14, which provides a second sector of the network, the second antenna system generating at least one beam pattern that propagates through the periphery 22 to facilitate communication with at least one item of user equipment external to the building. Hence, through use of the second antenna system, the combined access and backhaul unit 10 can re-radiate network coverage externally to the building, such that items of user equipment external to the building and falling within the coverage area of the second sector are now provided with a further connection option for connecting into the network.

For any users that connect to the apparatus 10 via either the first antenna system or the second antenna system, then the third antenna system is used to provide a common wireless backhaul path back into the network. By such an approach, it is possible to establish good quality links with items of user equipment in both the first and second sectors, through use of the respective first and second antenna systems. In combination with a good quality backhaul path provided by the third antenna system to a macro base station of the network, this can result in the various items of user equipment connected to the network via the apparatus 10 being provided with higher quality links into the network, allowing for more efficient use of the available network spectrum when compared with a situation where those items of user equipment instead establish a direct connection to a macro base station of the network. As a result, the overall spectral efficiency of the network can be increased.

It should be noted that if desired the apparatus 10 could be mounted externally to the building at the periphery, in which case the first antenna system would generate at least one beam pattern that propagates through the periphery into the building, whilst the second and third antenna systems' beam patterns would no longer need to propagate through the periphery. However, for the following description of embodiments, it will be assumed that the apparatus 10 is provided internally at the periphery of the building. This can enable a reduction in the cost of the apparatus, by avoiding the need to weatherproof the housing, and also provides for significantly simplified deployment. In one particular embodiment, the apparatus 10 is shaped so that it can readily be placed on a windowsill or the like within the building, this providing a very convenient location where it does not get in the way of users going about their business inside the building, and where it is likely that a strong connection with the base station of the network can be established.

Each of the antenna systems 12, 14, 16 will include not only an array of antenna elements used to transmit and receive the RF signals, but also the associated RF stage circuit elements that process the transmitted and received RF signals. In addition, each of the antenna systems will have associated baseband stage (i.e. digital signal processing stage) circuits for processing the transmit signals prior to them being converted into RF signals, and to process received signals after they have been converted from RF signals into baseband signals. These baseband stage circuits can be considered to be provided as part of the antenna system blocks 12, 14, 16, or may be considered to be part of the associated control system 18 that controls the operation of the various antenna systems, and the interactions between them. The control system 18 will provide all of the required control functionality for the different antenna systems, as well as controlling the routing of signals between the antenna systems so that signals received via the first and second antenna systems from items of user equipment can be routed through the third antenna system over the backhaul path to the network, and conversely signals to be propagated to those items of user equipment that are received over the backhaul path by the third antenna system can be routed to the appropriate first and second antenna systems for transmission to the required items of user equipment.

It should be noted that FIG. 1 is not intended to illustrate how the various components are laid out within the combined access and backhaul unit 10, but instead is merely a schematic illustration of the different antenna systems and associated control system. By way of example, whilst the third antenna system 16 is shown above the second antenna system 14, in one embodiment the second and third antenna systems are actually placed side by side, and hence when considering the vertical elevation view of the apparatus 10 as shown in FIG. 1, one of the second and third antenna systems would reside behind the other.

Figure 2:
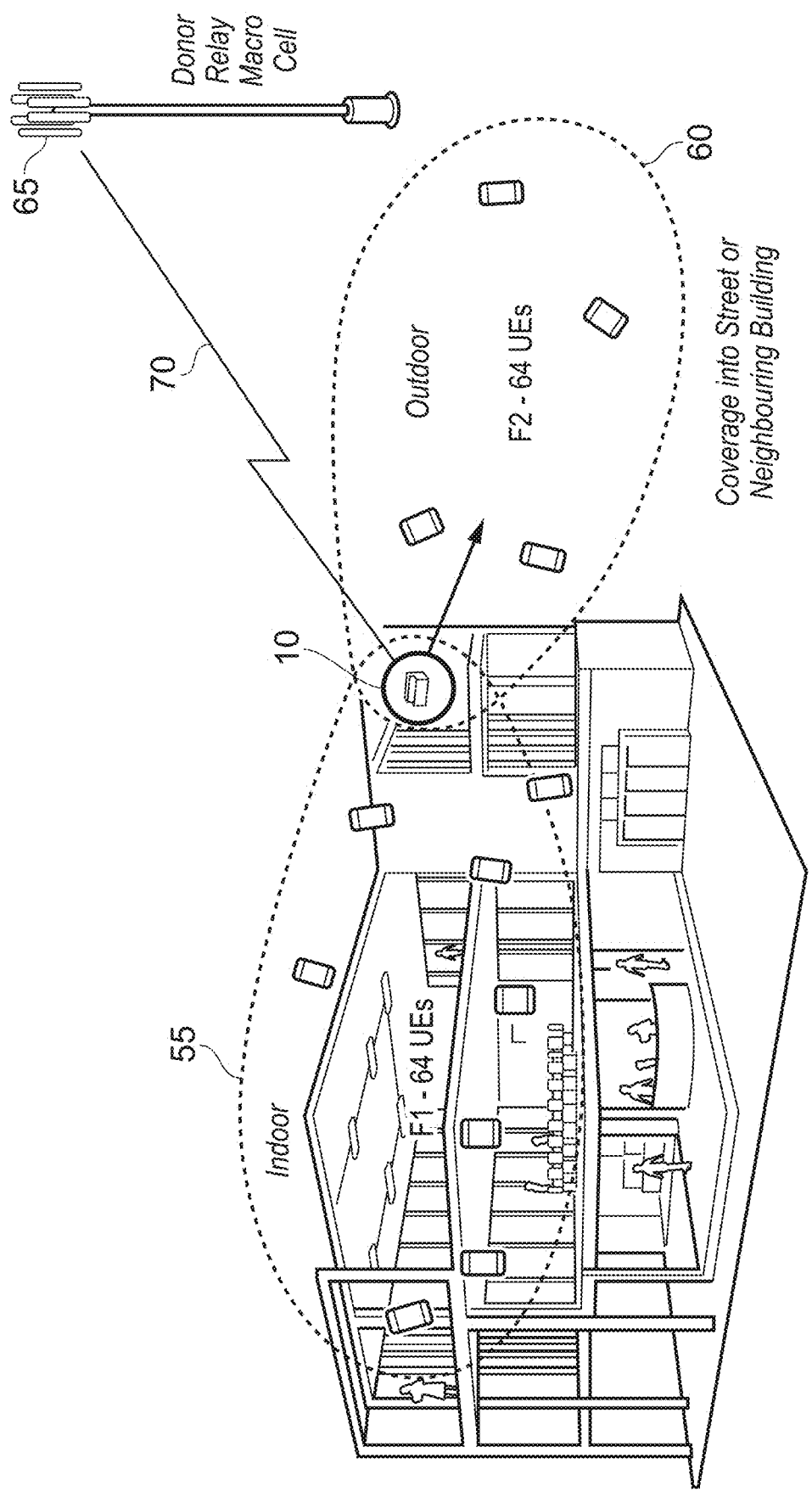
FIG. 2 illustrates how the apparatus of FIG. 1 creates indoor and outside sectors in accordance with one embodiment.

FIG. 2 schematically illustrates how the apparatus 10 may be used to establish both indoor and outdoor sectors for connection of items of user equipment. In particular, as shown, the combined access and backhaul unit 10 can be arranged to produce a first sector 55 of coverage through the beam pattern(s) employed by the first antenna system, and in addition can create an outdoor sector of coverage 60 through the beam pattern(s) deployed by the second antenna system 14. A common wireless backhaul path 70 can then be established by the third antenna system 16 communicating with a macro base station 65, also referred to herein as a donor relay macrocell, or a donor eNodeB (DeNB).

The first, second and third antenna systems can be arranged in a variety of ways, but in one embodiment each of those three antenna systems comprises an array of antenna elements, which are configured in a manner to allow an increase in spectral efficiency of the network when items of user equipment connect to the network via the apparatus 10 rather than connecting directly to a macro base station such as the illustrated base station 65. Since the apparatus is not a handheld device like normal items of user equipment, it is not constrained by size and power factors that would typically constrain the antennas within such handheld user devices. Hence, the array of antenna elements used in the various first, second and third antenna systems can be provided with characteristics that allow a more efficient modulation of signals than may be possible using the antenna system of an item of user equipment connecting to the apparatus 10.

For example, more antenna elements may be provided within each of the arrays, those antenna elements can be of a larger size, the antenna elements may be operated with higher power, and/or may be configured to provide higher gain, than would typically be the case for antenna elements within handheld items of user equipment. As a result, it has been found that a significant number of items of user equipment can connect to each combined access and backhaul unit 10, whilst providing good quality links into the network through the common wireless backhaul path 70. This can lead to a significant increase in the overall spectral efficiency of the network when compared with the situation where each of those items of user equipment individually connected to a macro base station of the network, for example by allowing more efficient modulation schemes to be used for the communications. In one embodiment up to 128 items of user equipment may be connected into each combined access and backhaul unit 10, and as schematically illustrated in FIG. 2 this could for example allow 64 items of user equipment to connect via the indoor sector 55 and another 64 items of user equipment to connect via the outdoor sector 60.

Figure 3:
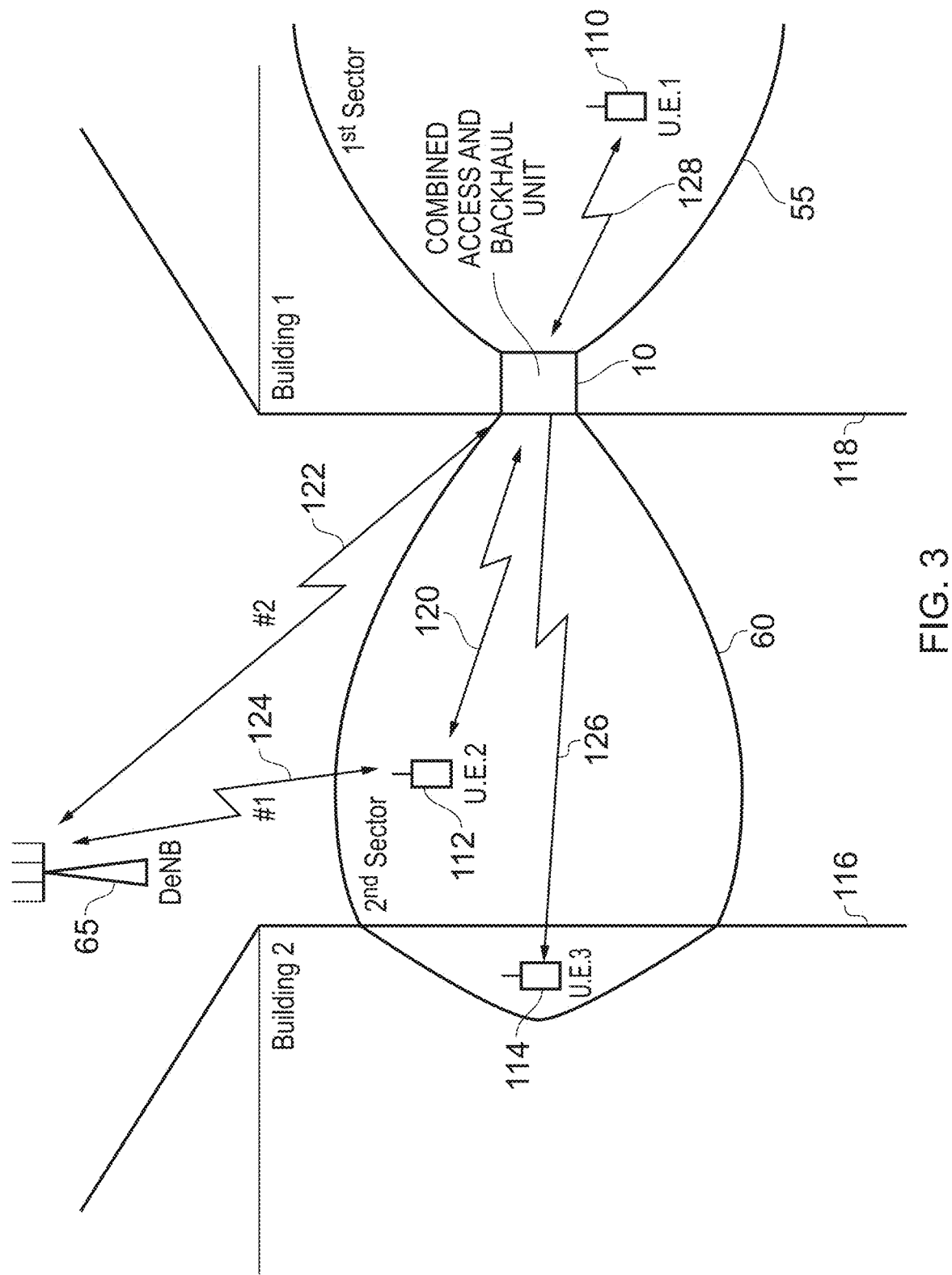
FIG. 3 illustrates how users may connect to the network using the apparatus of FIG. 1.

FIG. 3 schematically illustrates an urban environment in which a combined access and backhaul unit 10 is located on a windowsill in a first building 118, that first building 118 being positioned opposite to an adjacent building 116. External to both buildings a donor eNodeB (DeNB) 65 is provided to form a macro base station of the network. The combined access and backhaul unit 10 creates a first sector 55 of coverage through use of the first antenna system, and a second sector 60 of coverage that propagates into the open space external to the building. As schematically shown in FIG. 3 the second sector may in one embodiment extend far enough that it permeates inside the second building 116.

Considering first the item of user equipment 112 that is being operated externally to both buildings, this item of user equipment may have the option to connect directly to the donor eNodeB 65 as illustrated schematically by the communication path 124. However, through the provision of the combined access and backhaul unit 10, it also has the option to connect into the network via the unit 10, and in particular can establish a connection 120 with the second antenna system. If this route is taken, then the connection into the network will occur through the combination of the communication link 120 and the common backhaul link 122 provided by the third antenna system.

In some instances, it may be the case that the quality of the connection between the item of user equipment 112 and the second antenna system of the combined access and backhaul unit 10 is better than the quality of the communication link 124, and as a result the item of user equipment 112 may decide to connect to the unit 10, rather than directly to the donor eNodeB 65. For instance, the link 120 may allow a more efficient modulation scheme to be used than would be the case for the link 124. Provided a high performance backhaul link 122 can also be provided, then overall an improvement in spectral efficiency may be achieved by the item of user equipment 112 connecting into the network via the paths 120, 122, rather than directly over path 124.

It should be noted that this benefit may also be available to the item of user equipment 114 within the second building 116, in situations where that item of user equipment falls within the coverage area of the second sector 60. Accordingly, it may choose to access the network via the communication link 126 with the second antenna system 14, with the unit 10 then completing the connection into the network via the common backhaul link 122. In particular, due to the relative location of the second building 116 and the donor eNodeB 65, it may be that the item of user equipment 114 only obtains a relatively poor connection directly to donor eNodeB 65, whereas it may be able to make a higher quality connection 126 with the combined access and backhaul unit 10.

As also shown in FIG. 3, an item of user equipment 110 within the first sector 55 may connect into the donor eNodeB 65 via the combined access and backhaul unit 10, using a communication link 128 to the first antenna system, and with the unit 10 then using the common wireless backhaul link 122 to connect that item of user equipment 10 into the network.

In one embodiment, the frequency channel (i.e. frequency) used for communicating over the wireless backhaul link 122 is the same as the frequency channel used when items of user equipment connect directly to the donor eNodeB, and hence the same frequency channel will also be used for a connection made via path 124. However, the frequency channel used for communications between items of user equipment and the first and second antenna systems 12, 14 may in one embodiment be a different frequency channel to the frequency channel used for the communication links 122, 124. This can serve to mitigate interference between the communications within the first and second sectors 55, 60 using the first and second antenna systems 12, 14, and the communication links with the macro base station. However, in one embodiment, it is possible for all of these communication links to be provided within the same frequency band, hence allowing in-band access and backhaul links to be established.

Figure 4:
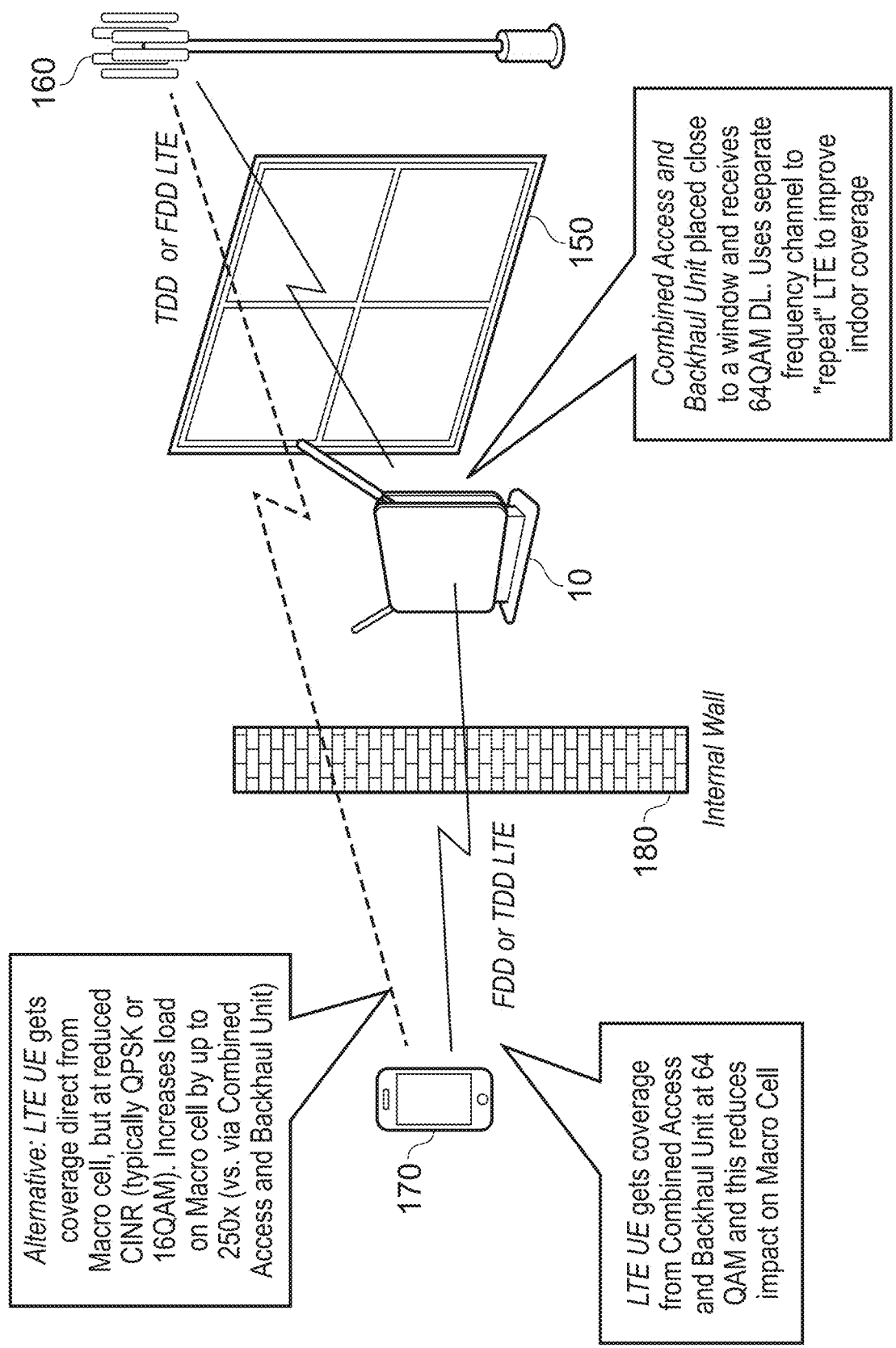
FIG. 4 schematically illustrates how improved spectral efficiency may be achieved when an item of user equipment connects to the network via the apparatus of FIG. 1.

FIG. 4 schematically illustrates how the use of the combined access and backhaul unit 10 can improve the overall quality of the connection for an item of user equipment. In this example, an indoor scenario is considered, where the unit 10 establishes a backhaul communication path with the macro base station 160 through the window 150. It is assumed here that an item of user equipment 170 within the building has the possibility of making a direct connection with the macro base station 160, but that various attenuating factors such as the internal wall 180, the window 150, etc, mean that the direct link is of a relatively poor quality, hence requiring relatively inefficient modulation schemes such as QPSK or 16QAM to be used. However, it is assumed that the wireless backhaul link can use a much more efficient modulation scheme such as 64QAM, and that similarly that more efficient modulation scheme can also be used for communications between the unit 10 and the item of user equipment 170. As a result, it is more spectrally efficient for the item of user equipment 170 to connect to the macro base station 160 via the combined access and backhaul unit 10, since through this connection method there is less overall impact on the macro cell, and hence overall spectral efficiency of the network can be increased.

It has been found that the use of the combined access and backhaul unit 10 can improve the spectral efficiency of the network in many situations, but provides particularly enhanced improvements in spectral efficiency and user equipment performance when deployed in the middle to outer regions of a coverage area of a macrocell provided by a DeNB.

Whilst the above described unit can provide significant network coverage and capacity benefits, there is a possibility that the shared backhaul connection provided by the third antenna system could become a bottleneck within the system, particularly where a significant number of users indoors connect to the first antenna system, while simultaneously a significant number of users are connecting from outside the building using the second antenna system. Further, with the ever increasing functionality of smartphones, the bandwidth demands of individual items of user equipment can be significant.

To seek to alleviate this issue, the unit 10 is provided with an additional resource for providing the backhaul connection, which can be used selectively instead of, or in combination with, the wireless backhaul link established by the third antenna system. In particular, in one embodiment, the unit is provided with a fourth antenna system that provides a wireless communication link to facilitate coupling of the apparatus into a mesh network of devices. The mesh network is arranged to have at least one point of access into the telecommunications network such that the mesh network supports provision of at least one further wireless backhaul path. Backhaul management circuitry within the unit 10 can then determine the extent to which the third antenna system and the fourth antenna system are used to support backhaul connectivity.

Figure 5:
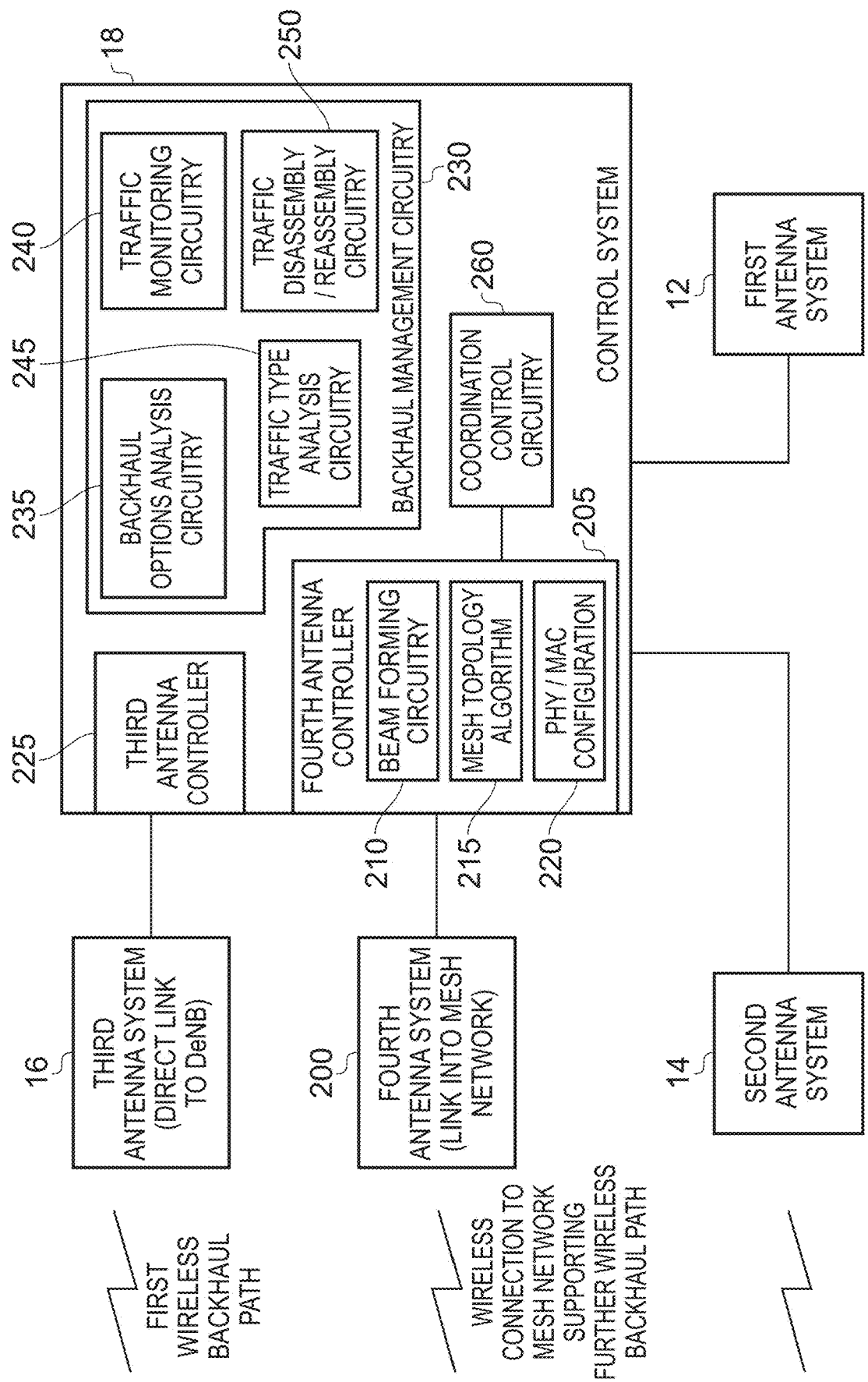
FIG. 5 is a block diagram illustrating in more detail components provided within an apparatus in accordance with one embodiment.

FIG. 5 is a block diagram illustrating components provided within the apparatus in accordance with one embodiment, in order to support the above use of a mesh network. As shown, in addition to the first, second and third antenna systems 12, 14, 16, the apparatus has a fourth antenna system 200 that can be used to make a connection into a mesh network of devices. That mesh network can be formed from various types of devices, but in one embodiment it is envisaged that many of the devices within the mesh network will be further instances of the apparatus of the described embodiment, and accordingly the mesh network will include multiple devices that each have a configuration as shown in FIG. 5.

The control system 18 will include antenna controller circuitry for each of the various antennas 12, 14, 16, 200 shown in FIG. 5. However, for ease of illustration, the antenna controllers associated with the first and second antenna systems are omitted from FIG. 5, since the following discussion will concentrate on how the control system controls the use of the third and fourth antenna systems to provide backhaul connectivity.

As shown, a third antenna controller 225 within the control system 18 is used to control the operation of the third antenna system 16, which is used to establish a direct wireless link with a DeNB. As mentioned earlier, the third antenna system in one embodiment can operate in the same frequency band as the first and second antenna systems, but in one particular embodiment operates with a signal frequency different to the signal frequency employed by the first and second antenna systems.

In one embodiment the fourth antenna system is arranged to operate at a significantly higher frequency than the frequencies used by the other three antenna systems 12, 14, 16. For example, in one embodiment the fourth antenna system can be arranged to operate in accordance with the WiGig Standard at 60 GHz. Whilst within urban environments such high frequency signals can be subject to significant attenuation due to the urban infrastructure such as buildings, the aim in one embodiment is to provide a significant number of devices to form the mesh network, so that line of sight or near line of sight connections can be established to form each of the mesh links within the mesh network. It has been found that in such a deployment, the high frequency used for the signals enables high data rates to be achieved, and can contribute to a significantly enhanced capacity and spectral efficiency within the system.

The fourth antenna system 200 is controlled by a fourth antenna controller 205, which in one embodiment includes beamforming circuitry 210 to control the beam pattern used to establish communication with at least one other device within the mesh network. The beamforming circuitry can use any of a number standard beamforming techniques, whether electronic or mechanical, and for example a sweep operation can be used to determine which other devices of the mesh network are candidates for connection, with the aim of establishing at least one good quality link into the mesh network.

The fourth antenna controller 205 is also arranged to employ a mesh topology algorithm 215, in one embodiment this being employed in combination with similar processes operating on other devices of the mesh network, in order to establish decentralised connection arrangements with one or more other devices forming the mesh network. Via these connections, the aim is for the mesh network to provide the backhaul management circuitry 230 within the device of FIG. 5 with a route through the mesh network to at least one point of access into the telecommunications network, thereby supporting provision of at least one further wireless backhaul path for the device. It will be appreciated that there are a number of known mesh topologies that can be used to establish a mesh network of devices, and accordingly this will not be described further herein.

As will be discussed in more detail later, it is possible in some embodiments for multiple of the devices within the mesh network to form a cluster where the antenna systems within those various devices are used in combination to enhance spectral efficiency of communication with items of user equipment that connect to the cluster. When such a cluster is formed, it may be the case that not each instance of the device within a cluster needs to have its own MAC layer, and instead the MAC layer within one of those devices may be used by all of the devices in the cluster, with each of the individual devices then providing its own PHY layer. The PHY/MAC configuration circuitry 220 within the fourth antenna controller 205 can be used to configure the PHY/MAC layers accordingly dependent on whether a cluster is formed or not.

When the device does form part of a cluster of devices within the mesh network, then coordination control circuitry 260 can be used to communicate with equivalent circuitry within the other devices of the cluster to control how the various antenna systems are used to communicate with connected items of user equipment. For example, the first and second antenna systems within each of the devices of the cluster can be used cooperatively to provide spectral efficiency enhancing features, such as coordinated multipoint (CoMP) communication, multiple-input multiple-out (MIMO) techniques to exploit multipath propagation, etc.

The control system 18 includes backhaul management circuitry 230 to control how the third and fourth antenna systems are used to provide backhaul connectivity. In particular, the backhaul management circuitry can in some situations arrange that only the third antenna system is used, in other situations may decide that only the fourth antenna system should be used, or more generally may choose to use a combination of the third and fourth antenna systems to provide backhaul connectivity. Further, when the device of FIG. 5 is able to establish a mesh link connection into the mesh network, and the backhaul management circuitry decides to make use of the fourth antenna system to provide at least some level of backhaul connectivity, it can decide whether the device should be used as a leaf node within the mesh network (so that the fourth antenna system is used only in association with backhaul traffic for the device's own first and second antenna systems 12, 14), or whether instead the device can act as a routing node, allowing the backhaul traffic from other devices of the mesh network to be routed through the fourth antenna system 200.

As shown in FIG. 5, the backhaul management circuitry 230 has a number of components that perform particular functions in relation to the management of backhaul communication, namely the backhaul options analysis circuitry 235, the traffic monitoring circuitry 240, the traffic type analysis circuitry 245 and the traffic disassembly/reassembly circuitry 250. Each of these elements will be discussed in more detail with reference to the later figures, but first reference will be made to FIGS. 6 and 7 to illustrate how the provision of the mesh network can support backhaul communication.

Figure 6:
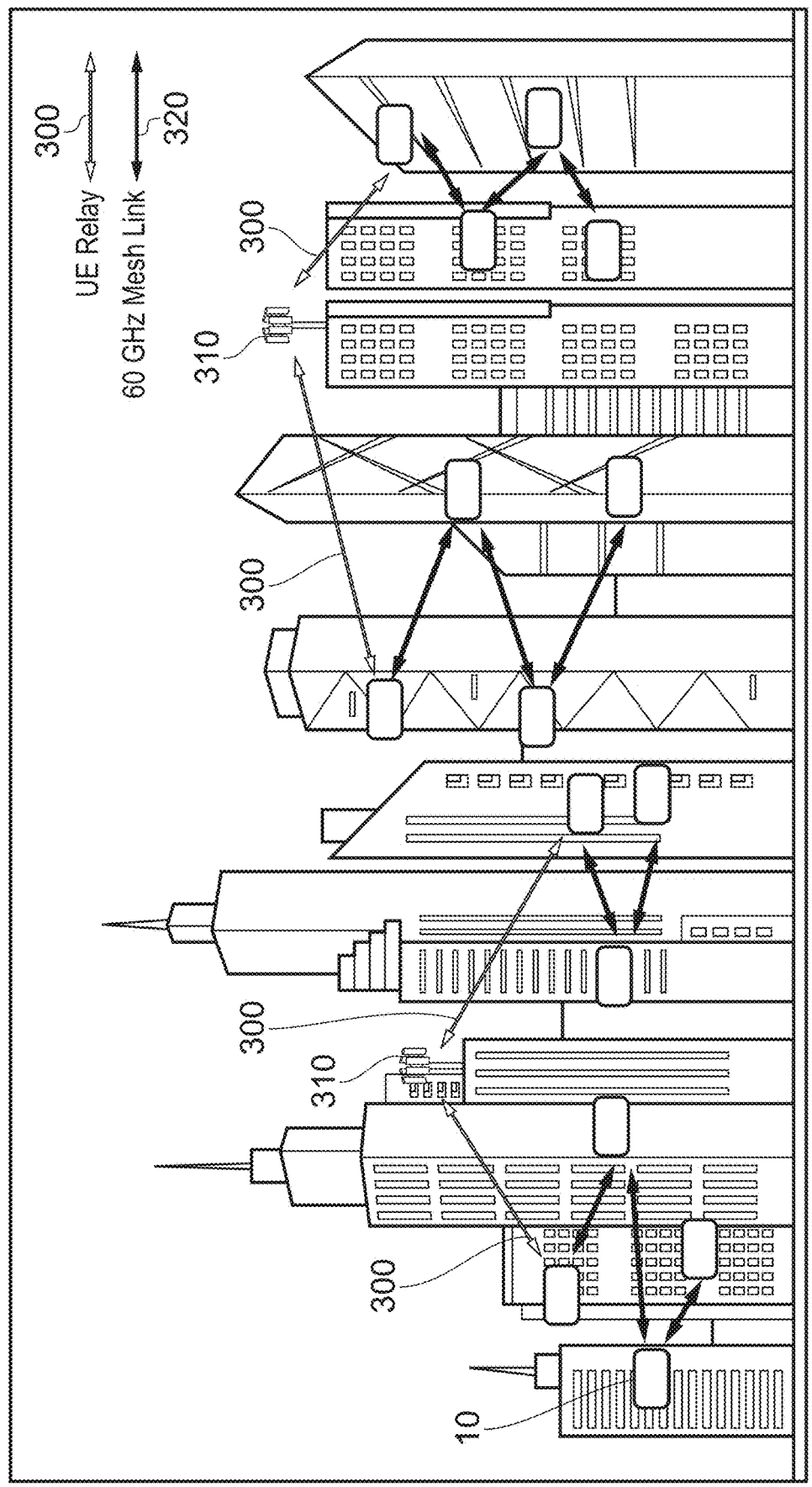
FIG. 6 is a diagram schematically illustrating how a mesh network of devices may be formed in accordance with one embodiment.

FIG. 6 illustrates an example deployment where multiple instances of apparatus 10 are deployed within a variety of buildings within an urban landscape, some of the devices being on higher floors of the buildings than others. Each of the boxes shown in FIG. 6 is in one embodiment an instance of the apparatus 10 described with reference to FIG. 5. Donor relay macrocells 310 are shown, in this instance those macrocells being located on the top of two buildings. Prior to the techniques described herein, each of the devices 10 would seek to make its own connection to a donor relay macrocell 310, to enable backhaul traffic to be communicated between those devices and the telecommunications network. However, as shown in FIG. 6, through the provision of the mesh network, it is possible for multiple of the devices to connect to each other via the fourth antenna system to create a mesh network of devices, with one or more of the devices within the mesh network then being able to provide a relay link 300 back to the macrocell 310. Those relay links 300 can then be used to carry the backhaul traffic for multiple of the devices within the mesh network. The individual mesh links are shown by the dark lines 320 in this particular example, and it can be seen that in this simplistic example each instance of the device 10 is provided with a route for backhaul traffic.

Whilst FIG. 6 shows a simple deployment, in the more general case it may be possible for individual devices to have available to them their own local backhaul communication link via the third antenna system, and also be provided with other backhaul options through their connection into the mesh network.

Figure 7:
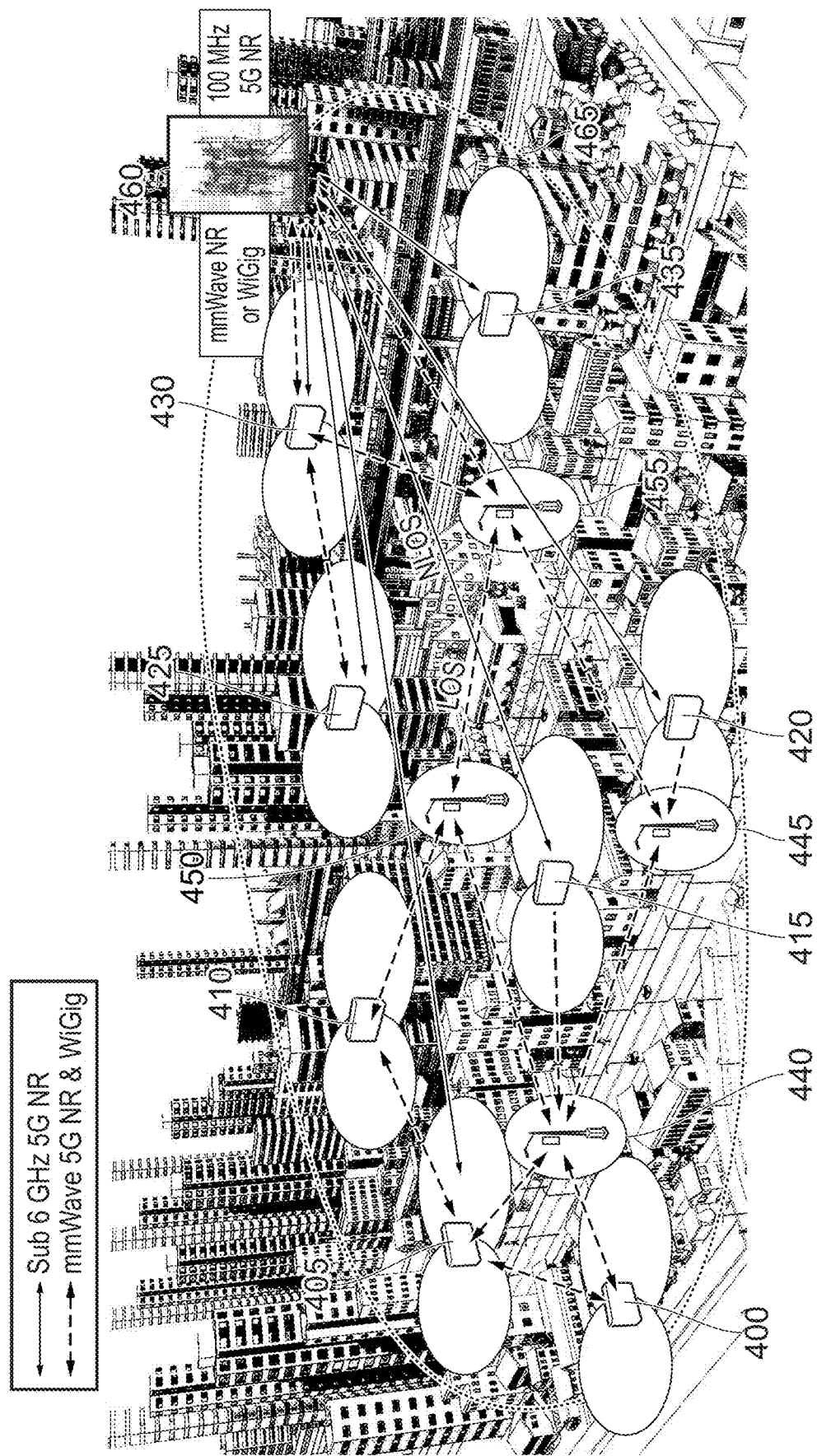
FIG. 7 is a diagram schematically illustrating how a mesh network may be established in one embodiment to support provision of at least one further wireless backhaul path in addition to, or as an alternative to, backhaul paths established directly by an apparatus of the described embodiments.

FIG. 7 shows another illustrative deployment where multiple combined access and backhaul units 400 to 435 are deployed within an urban environment. As illustrated by the rings emanating from each of those units, each unit can provide first and second sectors of coverage through use of the first and second antenna systems within those devices. It is assumed that each of the devices shown are within a cell area 465 associated with the macrocell 460. The solid lines shown where individual combined access and backhaul units have established their own direct backhaul link to the macrocell 460 through use of their third antenna system. The dotted lines illustrate mesh links established within the mesh network to provide an alternative backhaul communication path to the macrocell 460. Note that the device 400 does not establish a direct backhaul link from its third antenna system, but can make use of the mesh network to support the required backhaul connectivity.

In this example, additional street level nodes 440, 445, 450, 455 are deployed on street furniture such as lampposts, which can also be arranged to operate at the frequency used for the mesh network, to provide additional routing paths through the mesh network. This can provide a simple way to increase the availability of the mesh network in areas where there is deemed to be an insufficient number of combined access and backhaul units deployed.

In the example shown, it is assumed that the common wireless backhaul links established via the third antenna system are in the sub 6 GHz frequency range provided by the 5G NR Standard. Due to the frequency used, the common wireless backhaul path may require a near line of sight back to the macrocell 460, but an absolute line of sight is not necessarily required.

It is also assumed in this example that the mesh links operate at a much higher frequency, such as a mm wave or microwave frequency supported by the 5G NR Standard, or the 60 GHz frequency supported by the WiGig Standard. Due to the much higher frequency used, it will typically be the case that good quality links will only be established via direct line of sight, and accordingly it is desirable for a significant number of devices to be deployed which can form nodes within the mesh network, as illustrated schematically in FIG. 7. However, when such a mesh network can be provided, it provides significantly enhanced flexibility in the way in which a backhaul connection can be established for any particular combined access and backhaul unit, and also allows high spectral efficiency and a significantly enhanced capacity for the backhaul traffic, when compared with a system that only allows for the backhaul traffic to be routed via the third antenna system of each combined access and backhaul unit.

Figure 8:
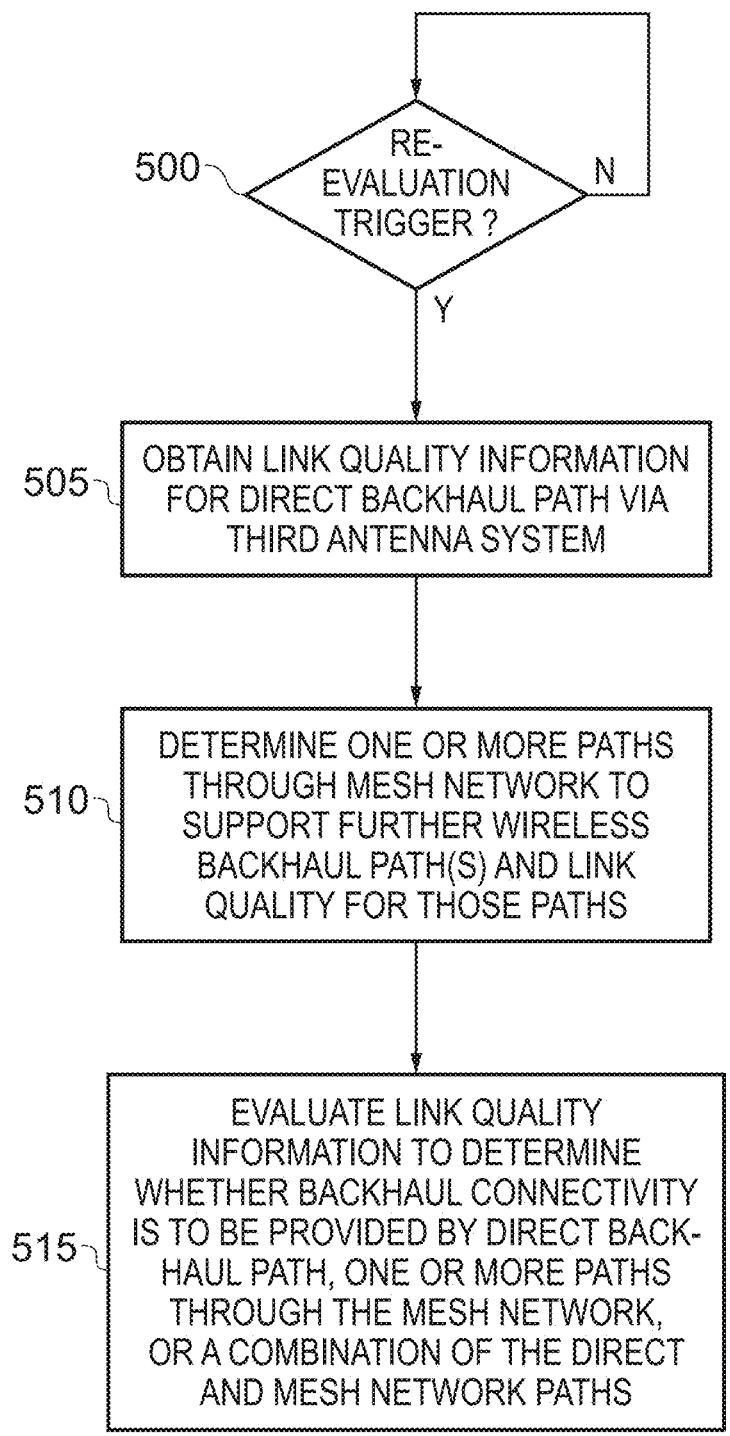
FIG. 8 is a flow diagram illustrating the operation of the backhaul options analysis circuitry in one embodiment.

FIG. 8 is a flow diagram illustrating the operation of the backhaul options analysis circuitry 235 of FIG. 5 in accordance with one embodiment, this circuitry performing a backhaul determination process to evaluate, having regards to link quality indications, which available backhaul paths to use to provide backhaul connectivity. This process can be triggered by a variety of events. For instance, in one embodiment the backhaul options analysis circuitry is arranged to perform the analysis at periodic intervals, for example by detecting the elapse of a timer. The frequency with which the re-evaluation is performed may depend on the type of deployment, and the frequency with which the link qualities are likely to change, but in one example deployment a re-evaluation every few minutes is likely to be sufficient.

As shown in FIG. 8, the process waits at step 500 for the re-evaluation trigger to be detected, and thereafter at step 505 the backhaul options analysis circuitry seeks to obtain link quality information for the direct backhaul path provided by the third antenna system. It will be appreciated that there are a number of ways of evaluating the link quality of a wireless communication link. For example, in one embodiment the Signal-to-Interference-plus-Noise Ratio (SINR) can be measured to give an indication of the theoretical upper bound of channel capacity of that link. In an alternative approach the link quality can be assessed based on link error rate.

At step 510, the backhaul options analysis circuitry can determine one or more paths through the mesh network to support the further wireless backhaul path or paths, and can then evaluate the link quality for those paths. As mentioned earlier, within the mesh network there will be at least one device that can make a backhaul connection into the telecommunications network, and there may be multiple routes through the mesh network that can be used to reach that device. Further, there could in fact be multiple devices within the mesh network that each can individually provide a wireless backhaul path, and accordingly it will be appreciated that there can be multiple different paths that could be used, and hence multiple different link quality measurements to be made at step 510.

Once the link quality information has been obtained, then at step 515 the backhaul options analysis circuitry evaluates the link quality information to determine whether the backhaul connectivity is to be provided by the direct backhaul path using the third antenna system, by one or more paths through the mesh network, or by a combination of the direct and mesh network paths.

Figure 9:
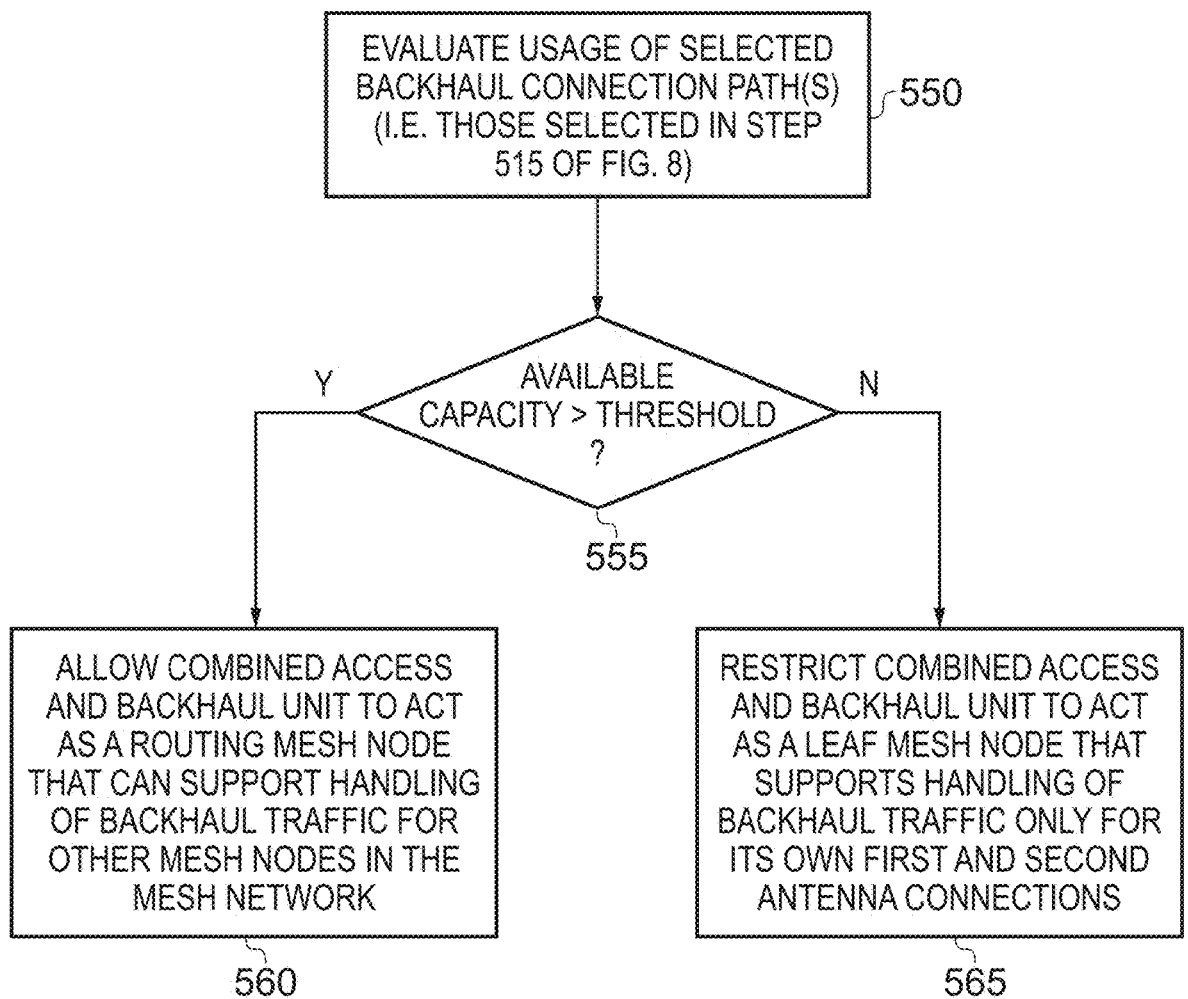
FIG. 9 is a flow diagram illustrating the operation of the traffic monitoring circuitry in accordance with one embodiment.

FIG. 9 is a flow diagram illustrating the operation of the traffic monitoring circuitry 240 within the backhaul management circuitry 230 shown in FIG. 5. In particular, assuming the device has connected into the mesh network, the traffic monitoring circuitry may be used to determine whether it is appropriate for the device to be used as a routing mesh mode or a leaf mesh mode within the mesh network. At step 500, the traffic monitoring circuitry evaluates the usage of the selected backhaul connection path or paths, these being the paths selected at step 515 of FIG. 8. The actual usage can then be compared against the overall capacity available through those path or paths in order to determine at step 555 whether the available capacity is greater than a threshold amount. If so, then the process proceeds to 560 where the combined access and backhaul unit is allowed to act as a routing mesh mode that can support handling of backhaul traffic for other mesh modes in the mesh network. As a result, this means that the combined access and backhaul unit can be used as an intermediate mode within the mesh network, or indeed can act as one of the points of access into the telecommunications network, for example one of the uppermost boxes in the illustrated example of FIG. 6.

In contrast, if the available capacity is determined not to exceed a chosen threshold, then the traffic monitoring circuitry 240 may restrict the combined access and backhaul unit to act as a leaf mesh mode to support handling of backhaul traffic only for its own first and second antenna connections. Hence, by way of example, in this situation the combined access and backhaul unit may be configured as shown in the lowermost instances of the devices shown in FIG. 6.

Whilst in FIG. 9 it is assumed that only a single threshold is used, in an alternative embodiment multiple different thresholds may be used, for example to determine the extent to which the combined access and backhaul unit can handle backhaul traffic for other devices. This could for example be used to identify the maximum number of other devices that can connect to it to seek backhaul connectivity support, or to decide what type of backhaul traffic it will allow to be routed through it. For example, if the capacity exceeded a first threshold, allowing the combined access and backhaul unit to be used as a routing mesh mode, unless it exceeds a further threshold the combined access and backhaul unit could restrict its use as a routing mesh mode so as to only allow control backhaul traffic to be passed through it from other devices, rather than user backhaul traffic. Alternatively, it could for instance identify that there is some spare capacity to allow other devices to connect to it to enable those devices to get backhaul support, but that having regard to the available capacity, only a maximum of X other devices within the mesh network should be allowed to connect to it. Hence, by such approaches, it is possible to limit the connected devices in order to balance available capacity.

Figure 10:
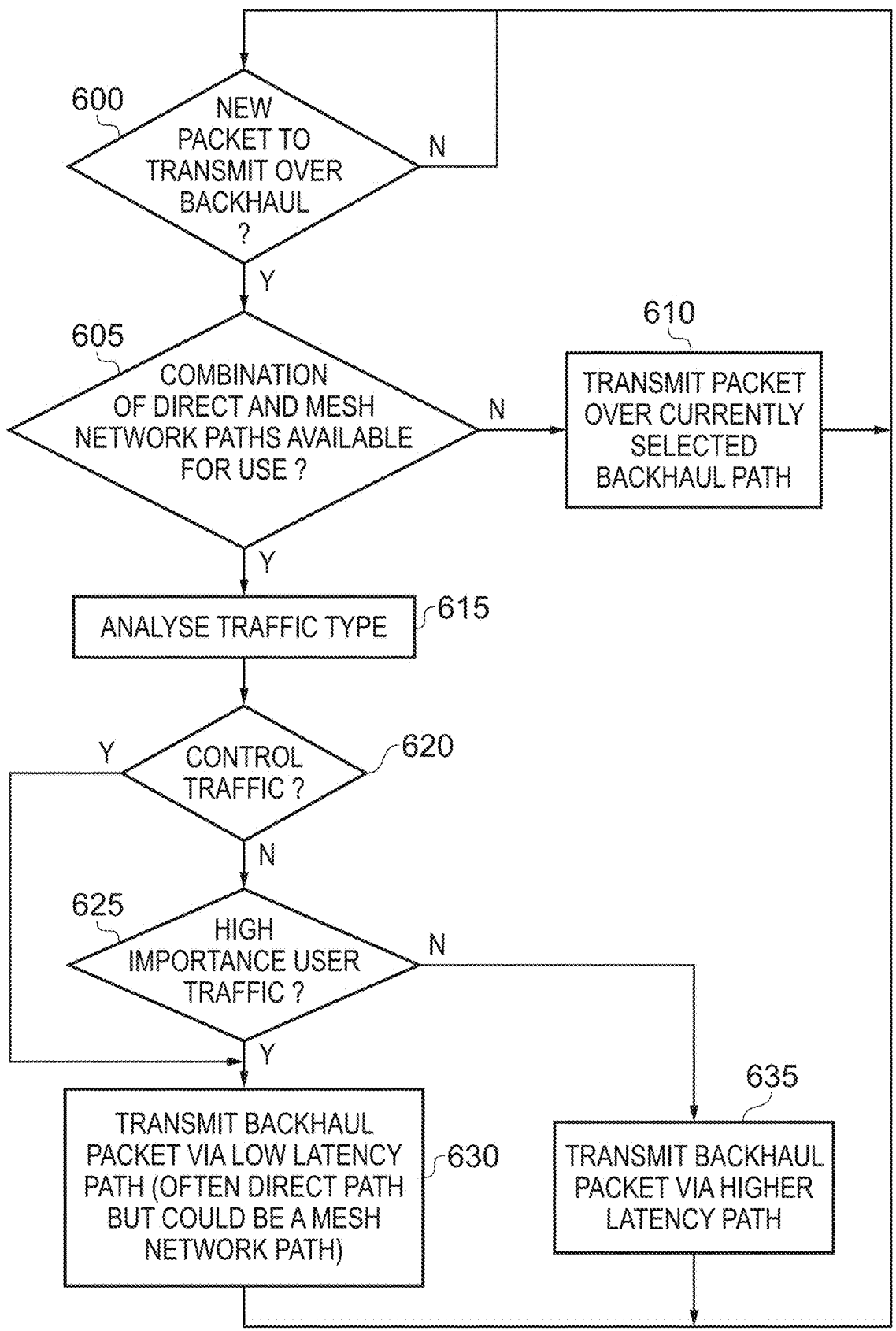
FIG. 10 illustrates how the traffic type analysis circuitry may be used in one embodiment to determine which route backhaul packets take through the system, in accordance with one embodiment.

FIG. 10 is a flow diagram illustrating how the traffic type analysis circuitry 245 of the backhaul management circuitry 230 of FIG. 5 is used in one embodiment, to determine which route is used for sending each packet of backhaul traffic. At step 600, it is determined whether there is a new packet to transmit over the backhaul, and if so it is then determined at step 605 whether a combination of the direct and mesh network paths are available for use. If not then the process proceeds to step 610, where the packet is transmitted over the currently selected backhaul path. In particular, as there is only one available backhaul path, there is no decision to be made as to which path to use. However, assuming at step 605 it is determined that there are more than one available backhaul paths to use, then the traffic type is analysed at step 615. There are a number of ways in which the traffic can be categorised based on its type, but in one embodiment the purpose of analysing the traffic type is to determine whether the traffic is to be treated as high importance traffic or low importance traffic. In one particular embodiment, high importance traffic is traffic that is considered to be less tolerant to transmission delay, and accordingly which requires use of a low latency path.

In one particular embodiment, the backhaul traffic may comprise control traffic pertaining to control of the apparatus and user traffic pertaining to communications between the apparatus and connected items of user equipment, with control traffic being always treated as of high importance. Conversely, whether the user traffic is treated as high or low importance may depend on a more detailed analysis of the type of that user traffic.

Accordingly, at step 620 it is determined whether the packet to be transmitted relates to control traffic, and if so the process proceeds to step 630 where the backhaul packet is transmitted via the available path that is considered to be the lowest latency path from amongst the available options. Often, this will be the direct path provided by the third antenna system, which represents a single hop path. However, in some instances it may be possible that a fast path through the mesh network is available, and that may represent a lower latency path, and accordingly in some instances it may be that a mesh network path is chosen at step 630.

If it is determined at step 620 that the backhaul traffic is not control traffic, then in the above described embodiment it will be user traffic, and at step 625 it is determined whether the packet relates to high importance user traffic. For example, certain user traffic may be specified as real time traffic, whilst others may be specified as non-real time traffic, and hence typically the real time traffic will be considered to be of higher importance than the non-real time traffic. As another example, different users can have different agreed quality of service (QoS) commitments from the network provider, and accordingly packets of user backhaul traffic associated with users having higher QoS commitments may be treated as of more importance than traffic associated with a lower QoS commitment.

If at step 625 it is determined that the user traffic is of high importance, then at step 630 it is transmitted via the backhaul path considered to provide the lowest latency path, whereas otherwise the process proceeds to step 635 where the backhaul traffic is transmitted via one of the other available paths, i.e. a path having a higher latency. The process then returns to step 600.

In the described embodiment, the common wireless backhaul link established through the third antenna system 16 is a dedicated link available for use in relation to items of user equipment connected via either the first or second antenna systems 12, 14. Further, the antenna elements forming the antenna array within the third antenna system are typically of a number and/or size, and are powered at a power level sufficient, to seek to ensure that a good quality connection can typically be established with the macro base station. However, in contrast the connection provided via the mesh network is likely to be shared by many different items of equipment supported by multiple mesh modes, and hence whilst the backhaul paths provided via the mesh network can provide a good quality link, the actual quality of the link may vary significantly over time, and hence in one embodiment it may be treated as being less reliable than the wireless backhaul communication link via the third antenna system. Hence, in one embodiment the lower importance traffic may be handled through the mesh network, this freeing up resource within the wireless backhaul link of the third antenna system for handling of the more important backhaul traffic. By such an approach, the unit 10 can provide a better user experience and faster connection speed than if only the third antenna system, or only the fourth antenna system, were used to support backhaul traffic.

Such an approach also enables "Quality of Experience" (QoE) of applications on smartphones, tablets and other devices to be maintained in contended situations by placing certain traffic on the mesh network links, and other traffic on the common wireless backhaul link. Commonly-owned copending publication number US 2016/0381585 A1 (U.S. application Ser. No. 15/187,570), the entire contents of which are hereby incorporated by reference, describes a system having a single backhaul link, within which multiple bearers are used as resources, and where a congestion determination mechanism is used to determine which bearers (some of which may be guaranteed bit rate (GBR)

bearers) are used, based on QoS considerations. A similar technique may be used in the above described embodiments to determine when to use each of the two different backhaul mechanisms, which for this purpose can be considered to be different bearers.

Figure 11:
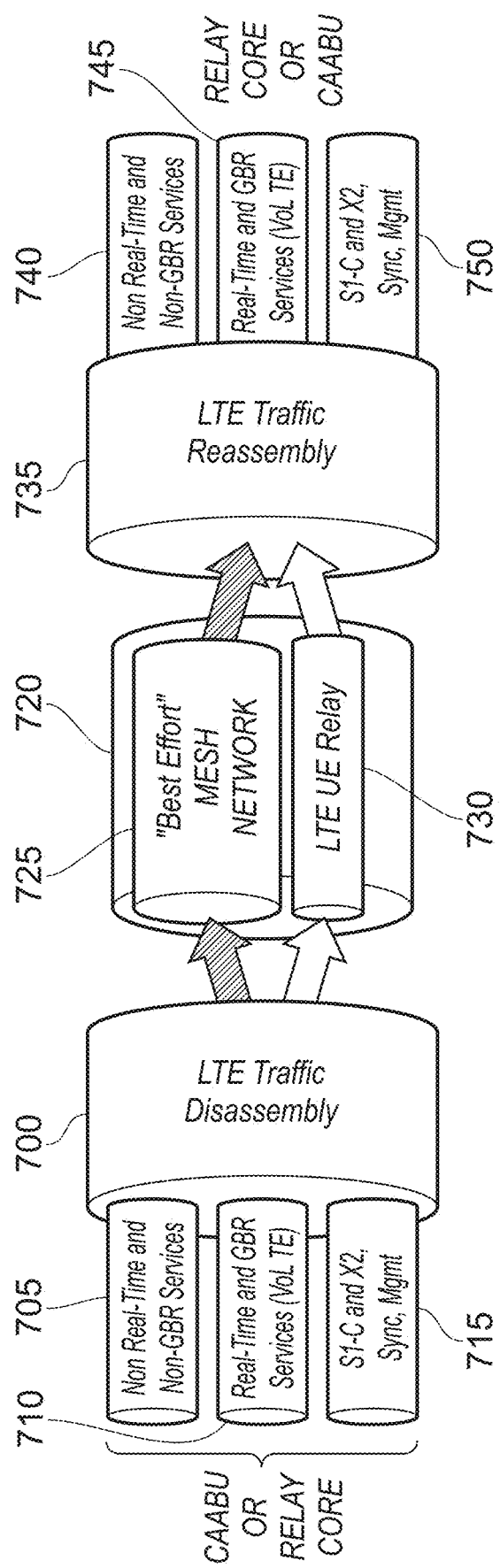
FIG. 11 is a diagram schematically illustrating how in one embodiment backhaul traffic may be disassembled to facilitate use of both the first wireless backhaul path provided by the third antenna system and the at least one further wireless backhaul path supported by the provision of the mesh network, with the backhaul traffic then being reassembled for onward propagation.

FIG. 11 schematically illustrates how, based on the analysis performed by the backhaul management circuitry, a stream of backhaul traffic is disassembled to form different sub-streams, one to be sent via the mesh network through the fourth antenna system 200 and one to be sent via the wireless backhaul link established through the third antenna system 16. In particular, traffic disassembly/reassembly circuitry 250 (see FIG. 5) within the backhaul management circuitry 200 can be arranged to perform traffic disassembly operations 700 in order to create the separate sub-streams of backhaul traffic.

As shown schematically in the left hand side of FIG. 11, the traffic to be transmitted over the backhaul can take a variety of forms, for example, it can be non-realtime or non-guaranteed bit rate (Non-GBR) traffic 705, or may be realtime and/or GBR traffic 710. The traffic type analysis circuitry 245 can distinguish between these two different types of user traffic, such that the non-realtime and/or non-GBR traffic is extracted into a sub-stream that is routed via the mesh network connection 725. Conversely, the realtime and GBR traffic 710 can be extracted by the traffic disassembly operations to generate a sub-stream that is routed via the wireless backhaul communication link 730 provided through the third antenna system 16.

Similarly, as mentioned earlier, the stream of backhaul traffic may include control packets 715, and in one embodiment these are always treated as high priority, and accordingly the traffic disassembly operations extract those packets and route them in the sub-stream that passes via the wireless backhaul communication link 730.

As schematically shown in FIG. 11, the mesh network link(s) 725 and the wireless backhaul link 730 collectively form a higher capacity connection mechanism 720, that can enable an overall increase in the capacity of the unit 10. The traffic passing through the mesh network connection 725 is routed at some point into a network carrier's core infrastructure, whilst the traffic passing via the wireless backhaul link 330 is routed via the coupled donor macrocell into the network carrier's core infrastructure. Within that core infrastructure, traffic reassembly operations 735 can be used to reconstruct the original backhaul traffic stream from the two sub-streams received, so that the three different example categories of backhaul traffic 740, 745, 750 can be propagated on to the relay core components.

Whilst the above description discusses use of the disassembly/reassembly mechanism in connection with uplink backhaul traffic from a combined access and backhaul unit 10 to the network carrier's core infrastructure, in one embodiment the technique can also be used to handle transmission of downlink backhaul traffic from the network carrier's core infrastructure to the combined access and backhaul unit. In such embodiments, the network carrier's core infrastructure will include circuitry to perform the traffic disassembly operations 700 and the traffic disassembly/reassembly circuitry 250 of the combined access and backhaul unit will perform the traffic reassembly operations 735.

Figure 12:
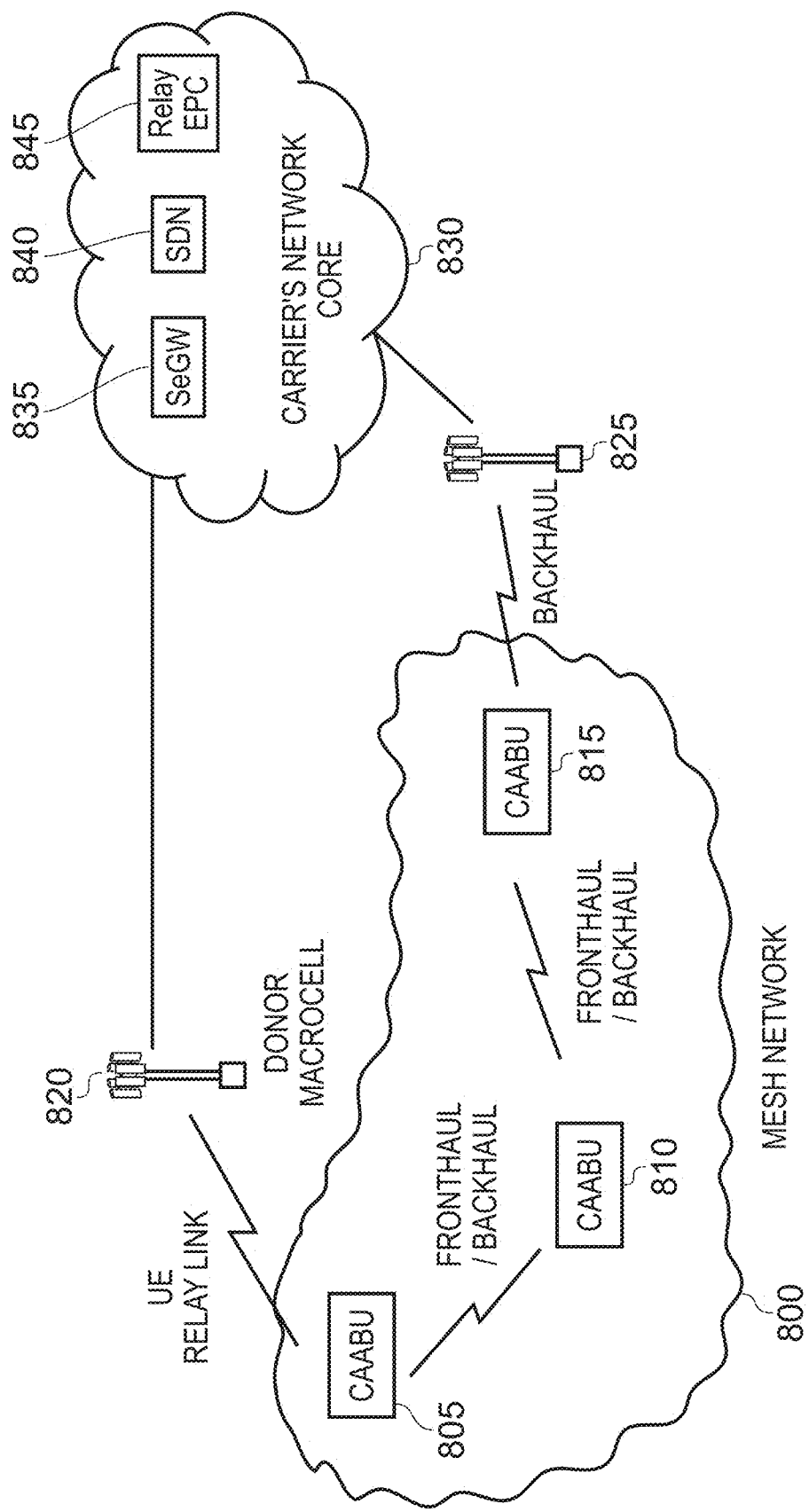
FIG. 12 is a diagram schematically illustrating the use of different backhaul communication paths in accordance with one embodiment.

FIG. 12 schematically illustrates a deployment incorporating the above described mechanism for disassembling and reassembling backhaul traffic. As shown, a mesh network 800 can be formed by multiple combined access and backhaul units 805, 810, 815, each of which may take the form discussed earlier with reference to FIG. 5. The third antenna system associated with the combined access and backhaul unit 805 is assumed in this example to make a backhaul connection to the donor macrocell 820 using its third antenna system. That donor macrocell 820 in turn connects back into the carrier's network core 830, for example using a physical connection such as an optical fibre connection.

However, the combined access and backhaul unit 805 also has the option to send some backhaul traffic through the mesh network to the combined access and backhaul unit 815, which may establish a backhaul connection to the macrocell 825, which in turn then connects into the carrier's network core 830 (alternatively the backhaul unit 815 may connect directly into the carrier's network core 830). Accordingly, the combined access and backhaul unit 805 may employ the earlier described disassembly and reassembly techniques in connection with the backhaul traffic, disassembling uplink backhaul traffic so that it can be routed via either of the above two described paths to the carrier's network core, and similarly reassembling downlink backhaul traffic received from the carrier's network core via both paths.

Considering the components within the carrier's network core 830, then for the received uplink backhaul traffic, various packets of traffic routed via the two mechanisms discussed above can then be aggregated back together within a gateway device 835 under the control of a unit 840, prior to the reconstructed backhaul stream being forwarded to the relay core 845 for onward propagation within the network. Similarly, for downlink backhaul traffic, the gateway device 835 can again be controlled by the unit 840 to disassemble the downlink traffic so that it can be routed by either of the two paths to the combined access and backhaul unit 805.

There are a number of known mechanisms that can be used to implement the disassembly 700 and reassembly 735 operations. In one embodiment, software-defined networking (SDN) techniques are employed to allow flexible delivery of bandwidth "on demand" through the selective use of the mesh network in addition to the main wireless backhaul connection. In one particular embodiment, the disassembly and reassembly techniques can be constructed based on industry standard SDN OpenFlow technology. In other embodiments, Multi-link Point to Point (ML-PPP) Protocol techniques can be used to perform the disassembly 700 and reassembly 735 operations.

Returning to FIG. 11, the schematic illustration is intended to illustrated how, in one example arrangement, the mesh network connection 735 effectively provides a "fat pipe" for best effort, low value traffic, whilst mission critical traffic, like signalling, VoLTE, etc is routed via the LTE backhaul link 730, which can be viewed to be a "strong pipe".

In one embodiment, the individual mesh link connections between the various devices 805, 810, 815 within the mesh network may themselves be backhaul connections. However, in an alternative embodiment, at least some of the devices of the mesh network are coupled via wireless mesh links that operate as fronthaul links, with a device within the mesh network that uses its third antenna system to then make a connection to a donor macrocell providing a wireless backhaul path accessible through the mesh network. Hence, in such an embodiment, the fourth antenna system may be arranged to establish a fronthaul link with at least one device of the mesh network. Use of fronthaul links within the mesh network has been found to be possible, due to the high bit rates that can be achieved between the various devices within the mesh network. When the individual devices can communicate via fronthaul links, this enables additional benefits to be realised. For example, the baseband unit functionality can be centralised amongst multiple devices within the mesh network, with those multiple devices forming a cluster, and in that instance the first and second antenna systems within each of the individual devices forming the cluster can be arranged to operate in a coordinated manner so as to enhance spectral efficiency of communication. This process is discussed in more detail with reference to the remaining figures.

Figure 13A:
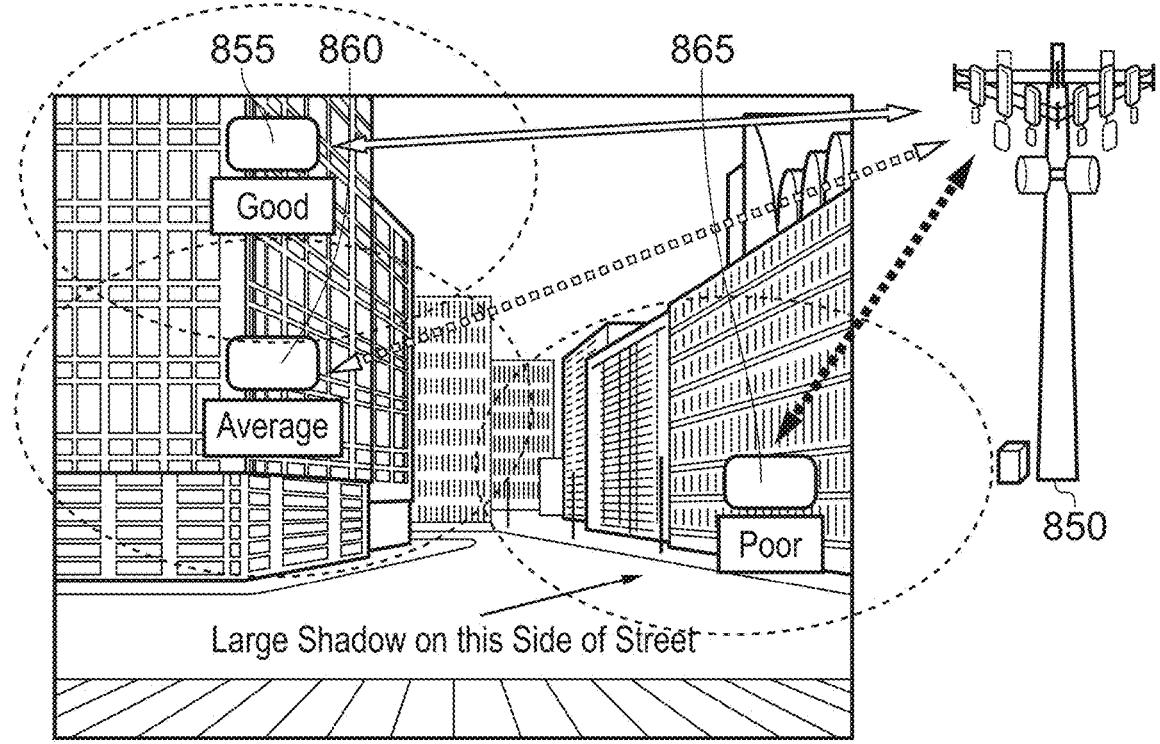
FIGS. 13A and 13B illustrate how multiple instances of the apparatus of the described embodiments may be arranged to form a cluster of devices within the mesh network, in accordance with one embodiment.

As shown in FIG. 13A, in a deployment where the fourth antenna system is not provided, and accordingly no mesh network can be established, each of the individual combined access and backhaul units 855, 860, 865 shown in FIG. 13A will aim to establish their own backhaul links with the donor macrocell 850. However, the quality of the backhaul link established will depend on the location of the individual combined access and backhaul unit. In this example, it is assumed that the unit 855 can establish a good quality connection, unit 860 can establish an average connection, but the unit 865 can only establish a poor connection, due to a shadowing effect from the building in which the unit is located.

Figure 13B:
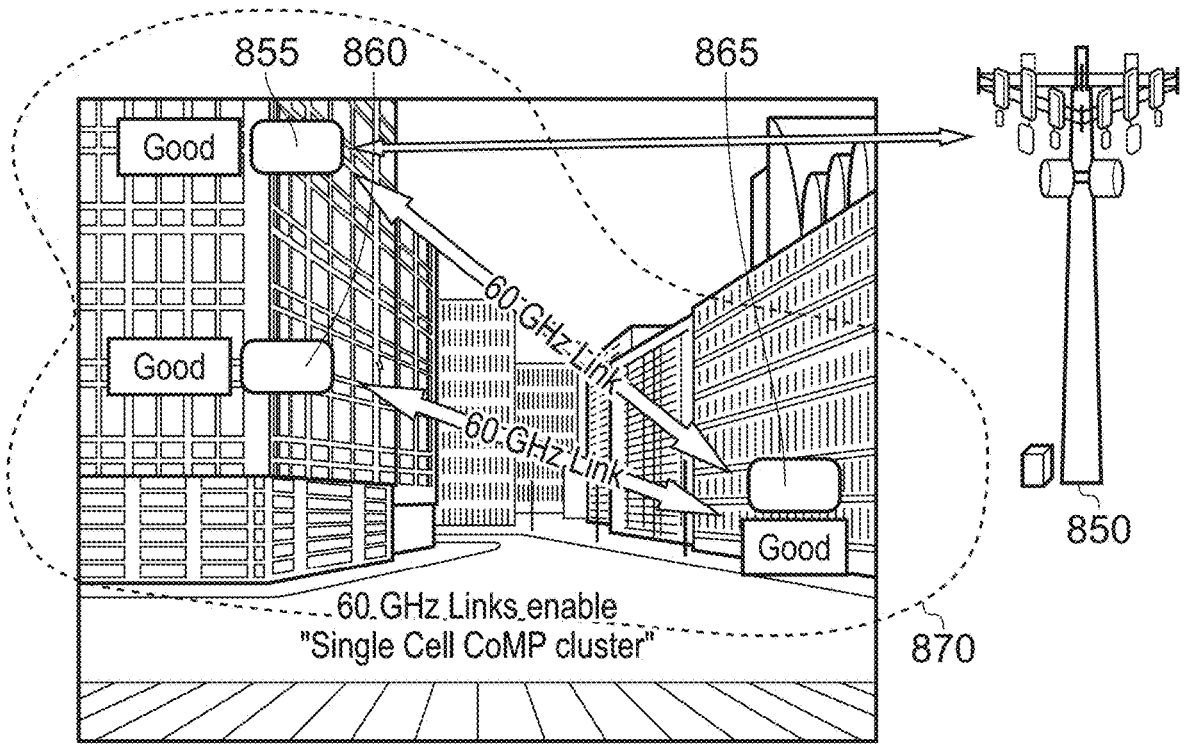

FIG. 13B illustrates how the provision of the mesh network can improve the situation, so as to enable each of the units to achieve a good quality connection to the macrocell 850. In particular, in this example the unit 865 establishes a mesh link with unit 855, and the unit 860 establishes a mesh link with the unit 865. The unit 855 then uses its third antenna system to make a good quality connection with the macrocell, and that backhaul connection is used to handle the backhaul traffic from each of the three units.

In addition, due to the high bit rates associated with the 60 GHz mesh links between the devices, in one embodiment these three devices can be grouped to form a cluster of devices denoted by the reference numeral 870. The cluster forms a virtual radio access network (RAN) (also sometimes referred to as a Cloud-RAN) for items of user equipment that connect to at least one of the antenna systems provided by the cluster. Hence, any particular item of user equipment sees the cluster as one virtual access point into the network. Each of the individual units 855, 860, 865 provide a first antenna system and a second antenna system, and these various antenna systems can be used in a coordinated manner to enhance spectral efficiency of communication. For example, the various antenna systems can be used cooperatively to provide CoMP communication, or may employ MIMO techniques to exploit multipath propagation, etc.

Figure 14:
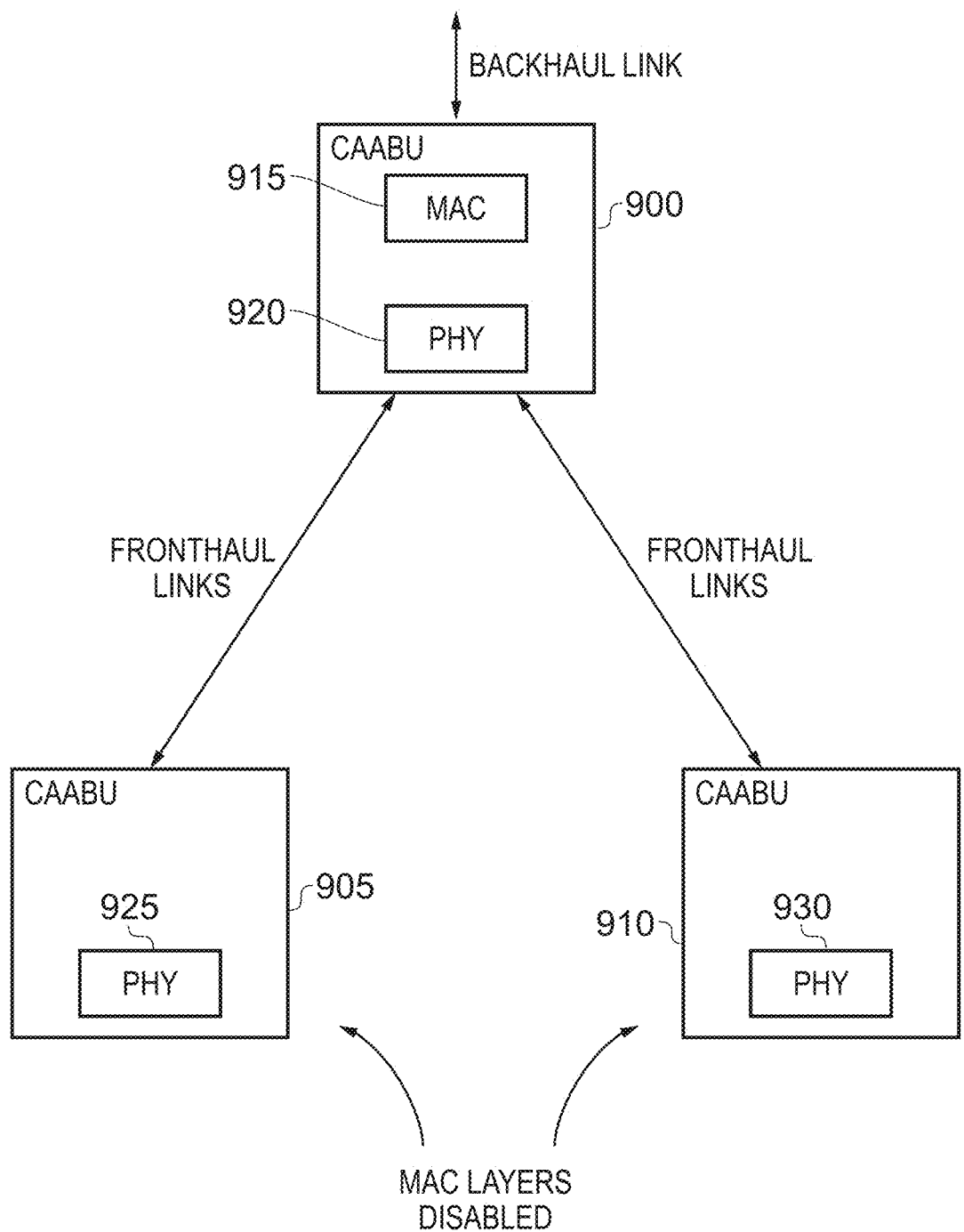
FIG. 14 illustrates how the MAC layer may be shared between devices forming a cluster such as that shown in FIG. 13B, in accordance with one embodiment.

When such a cluster is formed, it is possible to employ fronthaul links between the various devices in the cluster, as illustrated in FIG. 14. When fronthaul links are provided, each of the individual devices does not need to provide its own MAC layer. Instead, as shown in FIG. 14, three combined access and backhaul units 900, 905, 910 are shown, and it is assumed that they form a cluster, with a backhaul provision being provided by the combined access and backhaul unit 900, through that unit's third antenna system. The combined access and backhaul unit 900 employs both its MAC layer 915 and its PHY layer 920. However, within the other units 905, 910, the MAC layer functionality can be disabled, whilst the PHY layers 925, 930 continue to be used to handle the radio signals. As such, the baseband processing for all of the devices in the cluster can be performed by the MAC layer 915 within the combined access and backhaul unit 900. This is possible due to the high bit rates achievable via the mesh links, that facilitates the provision of fronthaul links between the various devices.

Figure 15:
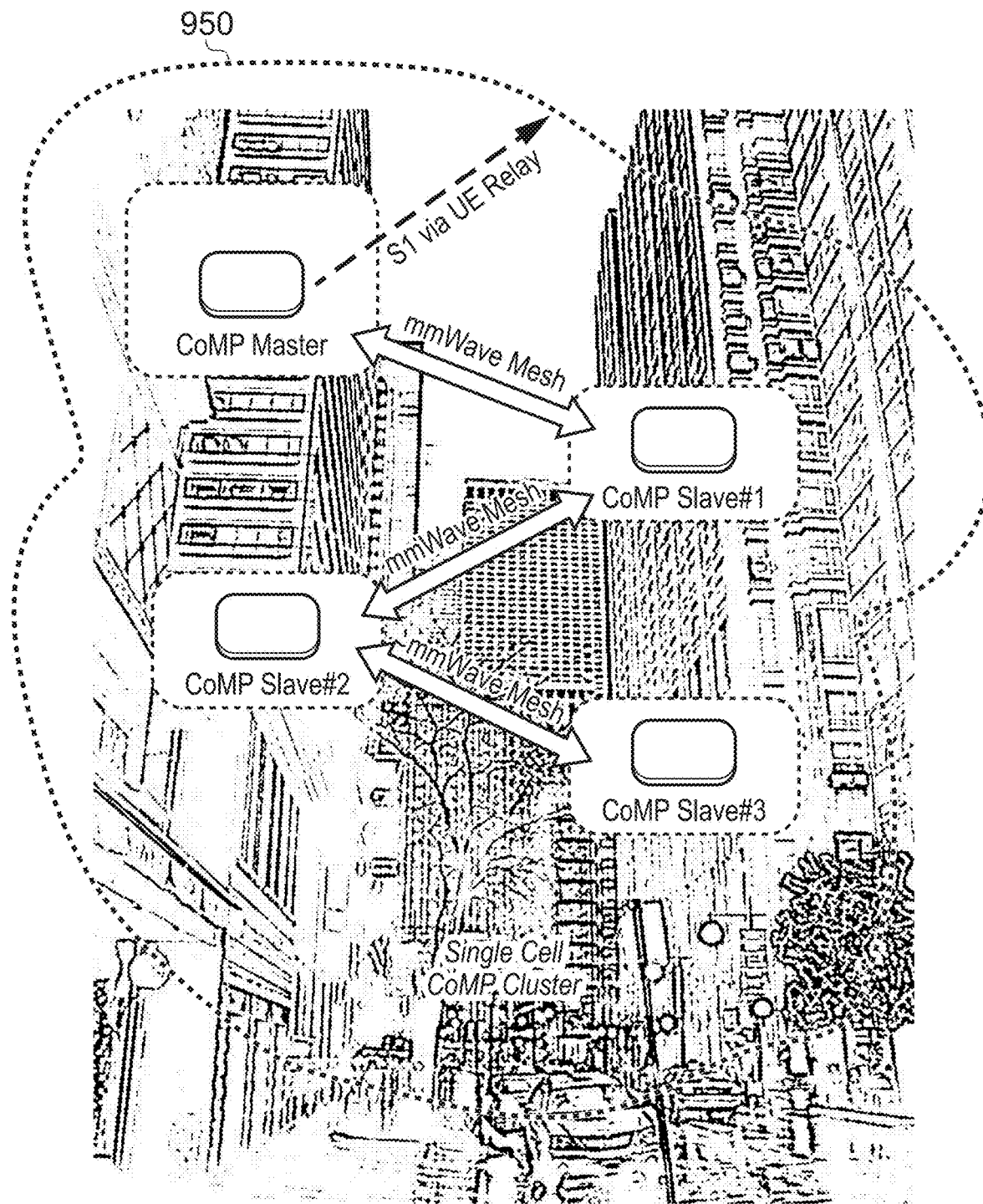
FIG. 15 is a diagram illustrating how such a cluster of devices may be formed as a CoMP cluster in one embodiment to implement coordinated multipoint techniques.

FIG. 15 illustrates an example arrangement where the cluster 950 of devices are arranged to operate to form a single CoMP cluster. The mm wave mesh links between the various devices allow the unit with the best UE relay link to provide the UE relay backhaul communication for all of the devices. There are a number of known CoMP communication techniques that can be used. For example the concepts for CoMP have been the focus of various studies by 3GPP for the LTE Advanced Telecommunications Standard. However, CoMP techniques can also be applied in telecommunications systems employing different Standards, for example the 5G New Radio (NR) Standard.

In one embodiment, when employing CoMP communication within the cluster for downlink communication, the various antenna systems can be arranged to utilise non-coherent joint transmission, where the antenna systems are used to simultaneously transmit data to an item of user equipment within the coverage area of the cluster 950 in order to improve the received signal quality and/or data throughput. When employing the coordinated multipoint communication for uplink reception of a signal transmitted from an item of user equipment, the various antenna systems can be arranged to employ a joint reception mechanism. Joint reception is essentially a diversity scheme that combines usage of the receiver chains of the various antenna systems of the devices within the mesh cluster for uplink communications from an item of user equipment, so as to seek to maximise signal to noise ratio.

From the above described embodiments, it will be seen that such embodiments allow significant improvements in network coverage to be readily obtained, and further the overall spectral efficiency of the network can be enhanced to improve network capacity, with the backhaul management circuitry maintaining an efficient backhaul connection through the combined use of a wireless backhaul path provided by the associated third antenna system and at least one further wireless backhaul path supported via its connection to the mesh network.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:
1. An apparatus comprising:
  a first antenna system to provide a first sector of a telecommunications network;
  a second antenna system to provide a second sector of the telecommunications network;

a third antenna system to communicate with a base station of the telecommunications network to provide a first wireless backhaul path for said first sector and said second sector;

a fourth antenna system to provide a wireless communication link to facilitate coupling of the apparatus into a mesh network of devices, the mesh network having at least one point of access into the telecommunications network such that the mesh network supports provision of at least one further wireless backhaul path for said first sector and said second sector; and backhaul management circuitry operable, in at least one mode of operation, to control utilisation of the third antenna system and the fourth antenna system to provide backhaul connectivity to the telecommunications network for at least items of user equipment connected to the apparatus via the first and second antenna systems, wherein the backhaul management circuitry comprises backhaul options analysis circuitry configured to perform a backhaul determination process to evaluate, for both said first wireless backhaul path and one or more routes through the mesh network to support said at least one further wireless backhaul path, at least one metric indicative of link quality, wherein the backhaul management circuitry is configured, when said at least one metric indicative of link quality satisfies at least one condition, to use a combination of the first wireless backhaul path and the at least one further wireless backhaul path to provide the backhaul connectivity to the telecommunications network, and wherein the backhaul management circuitry further comprises traffic monitoring circuitry to (i) evaluate available capacity of the first wireless backhaul path and the at least one further wireless backhaul path and (ii) determine, based on said evaluation, whether to allow the apparatus to act as a routing node within the mesh network, when acting as the routing node the apparatus being arranged to control usage of at least one of the third antenna system and the fourth antenna system to provide backhaul connectivity to the telecommunications network for items of user equipment connected to devices within the mesh network other than said apparatus.

2. An apparatus as claimed in claim 1, wherein the backhaul management circuitry is further arranged, in at least one mode of operation, to additionally control utilisation of the third antenna system and the fourth antenna system to provide backhaul connectivity to the telecommunications network for items of user equipment connected to devices within the mesh network other than said apparatus.

3. An apparatus as claimed in claim 1, wherein when the apparatus is deployed at a periphery of a building, the fourth antenna system is configured to generate at least one beam pattern that propagates away from the building to facilitate communication with at least one device of the mesh network external to the building.

4. An apparatus as claimed in claim 3, wherein the fourth antenna system comprises at least one array of antenna elements, and the apparatus further comprises beamforming circuitry to control said at least one beam pattern when establishing communication with said at least one device.

5. An apparatus as claimed in claim 1, wherein the backhaul options analysis circuitry is arranged to re-perform the backhaul determination process on occurrence of a trigger condition.

6. An apparatus as claimed in claim 1, wherein when the traffic monitoring circuitry determines that the available capacity is less than a selected threshold, the apparatus is constrained to act as a leaf node within the mesh network, when acting as the leaf node the apparatus being arranged to control usage of at least one of the third antenna system and the fourth antenna system to solely provide backhaul connectivity to the telecommunications network for items of user equipment connected to the apparatus via the first and second antenna systems.

7. An apparatus as claimed in claim 1, wherein the backhaul management circuitry comprises traffic type analysis circuitry to determine, for each block of backhaul traffic, a type of that traffic, and to select which one of the first wireless backhaul path and the at least one further wireless backhaul path is used for propagation of that block of backhaul traffic dependent on the determined type of that traffic.

8. An apparatus as claimed in claim 7, wherein each block comprises a packet, such that the determination as to which of the first wireless backhaul path and the at least one further wireless backhaul path to use is made on a packet-by-packet basis.

9. An apparatus as claimed in claim 7, wherein the backhaul management circuitry determines from the type of traffic whether an associated block of backhaul traffic is considered to be low importance or high importance, and is arranged to route backhaul traffic of high importance via one of the first wireless backhaul path and the at least one further wireless backhaul path that is chosen in dependence on path latency.

10. An apparatus as claimed in claim 7, wherein the backhaul management circuitry comprises traffic disassembly circuitry configured, in dependence on the type of traffic determined by the traffic type analysis circuitry, to disassemble a stream of backhaul traffic to be sent from the apparatus in order to form a first sub-stream to be sent via the first wireless backhaul path and a second sub-stream to be sent via the at least one further wireless backhaul path.

11. An apparatus as claimed in claim 10, further comprising:
downlink traffic reassembly circuitry, responsive to a first downlink sub-stream received via the third antenna system and a second downlink sub-stream received via said fourth antenna system, to aggregate together the first and second downlink sub-streams in order to form a stream of downlink backhaul traffic.

12. An apparatus as claimed in claim 1, wherein the devices of the mesh network are coupled via wireless mesh links that operate as backhaul links, and the fourth antenna system is arranged to establish a backhaul link with at least one device of the mesh network.

13. An apparatus as claimed in claim 1, wherein:
the devices of the mesh network are coupled via wireless mesh links that operate as fronthaul links;
the mesh network's at least one point of access into the telecommunications network provides said at least one further wireless backhaul path; and
the fourth antenna system is arranged to establish a fronthaul link with at least one device of the mesh network.

14. An apparatus as claimed in claim 13, wherein the apparatus is arranged to form a cluster with one or more other devices of the mesh network, the cluster forming a virtual radio access network (RAN) for items of user equipment that connect to at least one antenna provided by the cluster.

15. An apparatus as claimed in claim 14, wherein the cluster is arranged so that at least one of the devices provides a media access control (MAC) layer that is shared with at least one other device within the cluster.

16. An apparatus as claimed in claim 14, further comprising coordination control circuitry to operate in coordination with coordination control circuitry in the other devices in the cluster to employ at least one technique to enhance spectral efficiency of communication with items of user equipment that connect to the cluster.

17. An apparatus as claimed in claim 16, wherein said at least one technique comprises a coordinated multipoint (CoMP) communication technique employing multiple of the antenna systems provided by the devices within the cluster.

18. An apparatus as claimed in claim 1, wherein the fourth antenna system is arranged to communicate using one of mm wave and microwave wireless signals.

19. An apparatus as claimed in claim 1, wherein the first and the second antenna systems are configured such that when the apparatus is deployed at a periphery of a building, the first sector extends into the building to provide enhanced availability of the telecommunications network to items of user equipment within the building, and the second sector extends externally to the building to provide an additional source of telecommunications network coverage to items of user equipment external to the building.

20. An apparatus as claimed in claim 19, wherein when the apparatus is deployed inside the building at said periphery, the second antenna system is configured to generate at least one beam pattern that propagates through said periphery to facilitate communication with at least one item of user equipment within said second sector.

21. An apparatus as claimed in claim 20, wherein each of the third antenna system and the fourth antenna system is configured to generate at least one beam pattern that propagates through said periphery.

22. An apparatus as claimed in claim 20, wherein the apparatus is deployed adjacent to a window at said periphery.

23. An apparatus as claimed in claim 22, wherein the apparatus is shaped so as to facilitate placement on a windowsill.

24. A method of operating an apparatus having first, second, third and fourth antenna systems to provide network coverage in a telecommunications network, comprising:
employing the first antenna system to provide a first sector of the telecommunications network;
employing the second antenna system to provide a second sector of the telecommunications network;
employing the third antenna system to communicate with a base station of the telecommunications network to provide a first wireless backhaul path for said first sector and said second sector;
employing the fourth antenna system to provide a wireless communication link to facilitate coupling of the apparatus into a mesh network of devices, the mesh network having at least one point of access into the telecommunications network such that the mesh network supports provision of at least one further wireless backhaul path for said first sector and said second sector;
in at least one mode of operation, controlling utilisation of the third antenna system and the fourth antenna system to provide backhaul connectivity to the telecommunications network for at least items of user equipment connected to the apparatus via the first and second antenna systems by performing a backhaul determination process to evaluate, for both said first wireless backhaul path and one or more routes through the mesh network to support said at least one further wireless backhaul path, at least one metric indicative of link quality, determining that said at least one metric indicative of link quality satisfies at least one condition, and using a combination of the first wireless backhaul path and the at least one further wireless backhaul path to provide the backhaul connectivity to the telecommunications network;
evaluating available capacity of the first wireless backhaul path and the at least one further wireless backhaul path;
determining, based on said evaluating, that the available capacity is greater than a threshold amount; and
allowing, based on said determining that the available capacity is greater than the threshold amount, the apparatus to act as a routing node within the mesh network to control usage of at least one of the third antenna system and the fourth antenna system to provide backhaul connectivity to the telecommunications network for items of user equipment connected to devices within the mesh network other than said apparatus.

25. An apparatus comprising:
first antenna means for providing a first sector of a telecommunications network;
second antenna means for providing a second sector of the telecommunications network;
third antenna means for communicating with a base station of the telecommunications network to provide a first wireless backhaul path for said first sector and said second sector;
fourth antenna means for providing a wireless communication link to facilitate coupling of the apparatus into a mesh network of devices, the mesh network having at least one point of access into the telecommunications network such that the mesh network supports provision of at least one further wireless backhaul path for said first sector and said second sector; and
backhaul management means for controlling, in at least one mode of operation, utilisation of the third antenna means and the fourth antenna means to provide backhaul connectivity to the telecommunications network for at least items of user equipment connected to the apparatus via the first and second antenna means,
wherein the backhaul management means comprises backhaul options analysis means for performing a backhaul determination process to evaluate, for both said first wireless backhaul path and one or more routes through the mesh network to support said at least one further wireless backhaul path, at least one metric indicative of link quality,
wherein the backhaul management means is configured, when said at least one metric indicative of link quality satisfies at least one condition, to use a combination of the first wireless backhaul path and the at least one further wireless backhaul path to provide the backhaul connectivity to the telecommunications network, and
wherein the backhaul management means further comprises traffic monitoring means for (i) evaluating available capacity of the first wireless backhaul path and the at least one further wireless backhaul path and (ii) determining, based on said evaluation, whether to allow the apparatus to act as a routing node within the mesh network, when acting as the routing node the apparatus being arranged to control usage of at least one of the third antenna means and the fourth antenna means to provide backhaul connectivity to the telecommunications network for items of user equipment connected to devices within the mesh network other than said apparatus.

* * * * *